(12) United States Patent
Mizushima et al.

(10) Patent No.: US 8,801,189 B2
(45) Date of Patent: Aug. 12, 2014

(54) LASER PROJECTOR

(75) Inventors: Tetsuro Mizushima, Fukuoka (JP); Tatsuo Itoh, Osaka (JP); Kenichi Kasazumi, Osaka (JP); Kenji Nakayama, Kumamoto (JP)

(73) Assignee: Panasonic Corporation, Osaka (JP)

( * ) Notice: Subject to any disclaimer, the term of this patent is extended or adjusted under 35 U.S.C. 154(b) by 232 days.

(21) Appl. No.: 13/391,702

(22) PCT Filed: Jun. 20, 2011

(86) PCT No.: PCT/JP2011/003503
§ 371 (c)(1),
(2), (4) Date: Feb. 22, 2012

(87) PCT Pub. No.: WO2011/161931
PCT Pub. Date: Dec. 29, 2011

(65) Prior Publication Data
US 2012/0147334 A1    Jun. 14, 2012

(30) Foreign Application Priority Data

Jun. 22, 2010 (JP) .................. 2010-141716
Jul. 12, 2010 (JP) .................. 2010-158112

(51) Int. Cl.
| | | |
|---|---|---|
| G03B 21/14 | (2006.01) | |
| G03B 21/20 | (2006.01) | |
| H04N 9/31 | (2006.01) | |
| G02B 13/00 | (2006.01) | |
| G02B 27/48 | (2006.01) | |
| G02B 27/09 | (2006.01) | |
| G02B 27/14 | (2006.01) | |

(52) U.S. Cl.
CPC ............ *G02B 13/007* (2013.01); *G03B 21/208* (2013.01); *H04N 9/3161* (2013.01); *G02B 27/141* (2013.01); *G03B 21/2006* (2013.01); *H04N 9/3164* (2013.01); *G02B 27/48* (2013.01); *G03B 21/2033* (2013.01); *G02B 27/0933* (2013.01); *G03B 21/14* (2013.01)
USPC .............................. 353/38; 353/102; 353/31

(58) Field of Classification Search
USPC ............ 353/31, 33, 34, 37, 38, 102; 359/630; 349/5–9; 348/742, 743, 771
See application file for complete search history.

(56) References Cited

U.S. PATENT DOCUMENTS 6,081,381 A * 6/2000 Shalapenok et al. .......... 359/619
6,594,090 B2 * 7/2003 Kruschwitz et al. .......... 359/707
(Continued)

FOREIGN PATENT DOCUMENTS

JP    2003-98476    4/2003
JP    2005-70089    3/2005
(Continued)

OTHER PUBLICATIONS

International Search Report issued Jul. 12, 2011 in International (PCT) Application No. PCT/JP2011/003503.

*Primary Examiner* — William C Dowling
(74) *Attorney, Agent, or Firm* — Wenderoth, Lind & Ponack, L.L.P.

(57) ABSTRACT

There is provided a laser projector, including: a laser source section for emitting laser beams; a spatial light modulator which modulates the laser beams to generate image light; a projector lens from which the image light is emitted; a beam shaper which shapes the laser beams into a shape of the spatial light modulator; and a pupil uniformizer which makes a light intensity distribution uniform at an exit pupil of the projector lens, wherein the pupil uniformizer is situated between the laser source section and the beam shaper.

12 Claims, 17 Drawing Sheets

(56) References Cited

U.S. PATENT DOCUMENTS

| | | | |
|---|---|---|---|
| 6,669,345 B2 * | 12/2003 | Yajima .............................. | 353/38 |
| 7,196,743 B2 | 3/2007 | Abe et al. | |
| 8,192,030 B2 * | 6/2012 | Mizushima et al. ............ | 353/31 |
| 2003/0039036 A1 | 2/2003 | Kruschwitz et al. | |
| 2005/0041165 A1 | 2/2005 | Abe et al. | |
| 2008/0165401 A1 | 7/2008 | Kasazumi | |
| 2010/0271598 A1 | 10/2010 | Murayama et al. | |
| 2011/0234985 A1 * | 9/2011 | Ryf et al. ........................ | 353/38 |

FOREIGN PATENT DOCUMENTS

| | | |
|---|---|---|
| JP | 2005-84117 | 3/2005 |
| JP | 2006-227083 | 8/2006 |
| JP | 2008-204643 | 9/2008 |
| JP | 2009-216843 | 9/2009 |
| JP | 2010-256572 | 11/2010 |
| WO | 2006/090681 | 8/2006 |
| WO | 2011/040479 | 4/2011 |

* cited by examiner

LASER PROJECTOR

This application is a 371 of PCT/JP2011/003503, filed Jun. 20, 2011.

TECHNICAL FIELD

The present invention relates to a laser projector which uses laser as a light source.

BACKGROUND OF THE INVENTION

Recently, a projector, which projects images on various projection surfaces such as a screen, has been widely used. A lamp is generally used as a light source of the projector. The lamp has, however, a short life. A color reproduction range of the lamp is also limited. In addition, there are drawbacks of a large required area and inefficient light utilization of the lamp.

It is attempted that a laser source is used as the light source of the projector, in order to solve the aforementioned problems. The laser source has a longer life and a stronger directivity than the lamp. Accordingly, it is likely that the laser source efficiently utilizes light. The laser source is monochromatic to achieve a large color reproduction range. Therefore, the projector utilizing the laser source may display vivid images.

If a smaller laser source than a conventional lamp is utilized as a light source of a projector, various optical elements incorporated in the projector are also miniaturized because the laser source is a point light source. Accordingly, it is expected that it contributes to development of a novel portable projector if the laser source is applied to the light source of the projector. The projector utilizing the laser source is called a "laser projector" in the following descriptions.

The laser projector has a problem about speckle noise. The speckle noise results from high coherence of the laser beam. It is known that the speckle noise occurs in a diffracted field so that a pattern, which is caused in an optical system, appears on a display surface and in an image field so that viewer's eyes perceive resultant fine particulate noise from scattered laser beams on the display surface. The former speckle noise in the diffracted field may become problematic in an exposure device and an illumination optical system. Both speckle noises in the diffracted field and the image field become problematic in the laser projector.

If a projector is miniaturized, an optical system has to illuminate a spatial light modulator uniformly enough to modulate the laser beams and create image light, in addition to utilizing characteristics of the point light source, which is different from an optical system such as a conventional lamp or LED as the light source. The miniaturization of the projector also requires efficient light utilization to overcome resultant problems from heat generation.

If the laser source is used as the light source of the projector, light intensity has to be sufficiently decreased on the retina of a viewer in terms of safety reasons. Accordingly, the light intensity of the laser beams emitted from a projector lens has to be reduced or the light has to be prevented from condensing on the retina of the viewer.

There are various proposals for reduction in the speckle noise and enhanced safety of the laser projector (c.f., Patent Documents 1 and 2).

The laser projector disclosed in Patent Document 1 includes a laser source; a beam spreader; a beam shaper, which consists of two sets of fly's eye lenses, a condensing lens and a field lens; and a moving diffuser. The combination of the beam shaper with the moving diffuser results in uniform illumination to the spatial light modulator and decreased speckle noise.

The laser projector disclosed in Patent Document 1, however, requires a relatively large optical system (as large as the optical system used together with the lamp). Accordingly, such a laser projector is unsuitable for the miniaturization of the optical system. In addition, the disclosed laser projector achieves an insufficient level in terms of the reduction in the speckle noise and safety of the laser projector.

Patent Document 2 proposes that an optical power is decreased to a prescribed level if it is detected that a person comes into an area near a projection area in which the laser beam is projected. Patent Document 2 discloses technologies, which prevent intensive light from condensing on the human retina.

The projector of Patent Document 2, however, has a complicated structure. Therefore, the projector of Patent document 2 is likely to become a large size. Accordingly, an optical design which always prevents the intensive light from condensing on the human retina without reducing the optical power is desired as a basic safety measure.

It is proposed to utilize an element such as a diffraction element or HOE element, which is processed by a wavelength order, as a beam shaper of the laser source. The utilization of these elements as the beam shapers results in a limited usable range of wavelengths and incident angles. Accordingly, the utilization of such elements as the beam shapers is not directed to make light intensity uniform and precisely shape beams if there are several wavelengths and light sources. In addition, it becomes likely that the utilization of these elements as the beam shapers causes resultant spots of power concentration from 0-order light.

In the aforementioned proposals, the optical design is not sufficiently examined for reducing the speckle noise and achieving a high luminance and a high safety while maintaining a compact size of the laser projector.

Patent Document 1: JP 2003-98476 A
Patent Document 2: JP 2006-227083 A

DISCLOSURE OF THE INVENTION

An object of the present invention is to provide a safe and compact laser projector having an optical system which realizes high luminance with little speckle noise.

According to one aspect of the present invention, a laser projector including: a laser source section configured to emit laser beams; a spatial light modulator which modulates the laser beams to generate image light; a projector lens from which the image light is emitted; a beam shaper configured to shape the laser beam into a shape of the spatial light modulator; and a pupil uniformizer which makes a light intensity distribution uniform at an exit pupil of the projector lens, wherein the pupil uniformizer is situated between the laser source section and the beam shaper.

The aforementioned laser projector may suitably make a uniform light intensity distribution of a projected image and a uniform light intensity distribution at the exit pupil of the projector lens. It becomes less likely that excessively intensive light is emitted, so as to make the laser projector safe. In addition, as a result of the uniform light intensity distribution of the projected image and the uniform light intensity distribution at the exit pupil of the projector lens, it becomes less likely that locally intensive light causes speckle noise. Accordingly, even if the laser projector is compact, high safety may be achieved with little speckle noise.

Other objects, features and advantages of the present invention will be more apparent by the following detailed descriptions and the attached drawings.

DETAILED DESCRIPTION OF THE INVENTION

Figure 1:
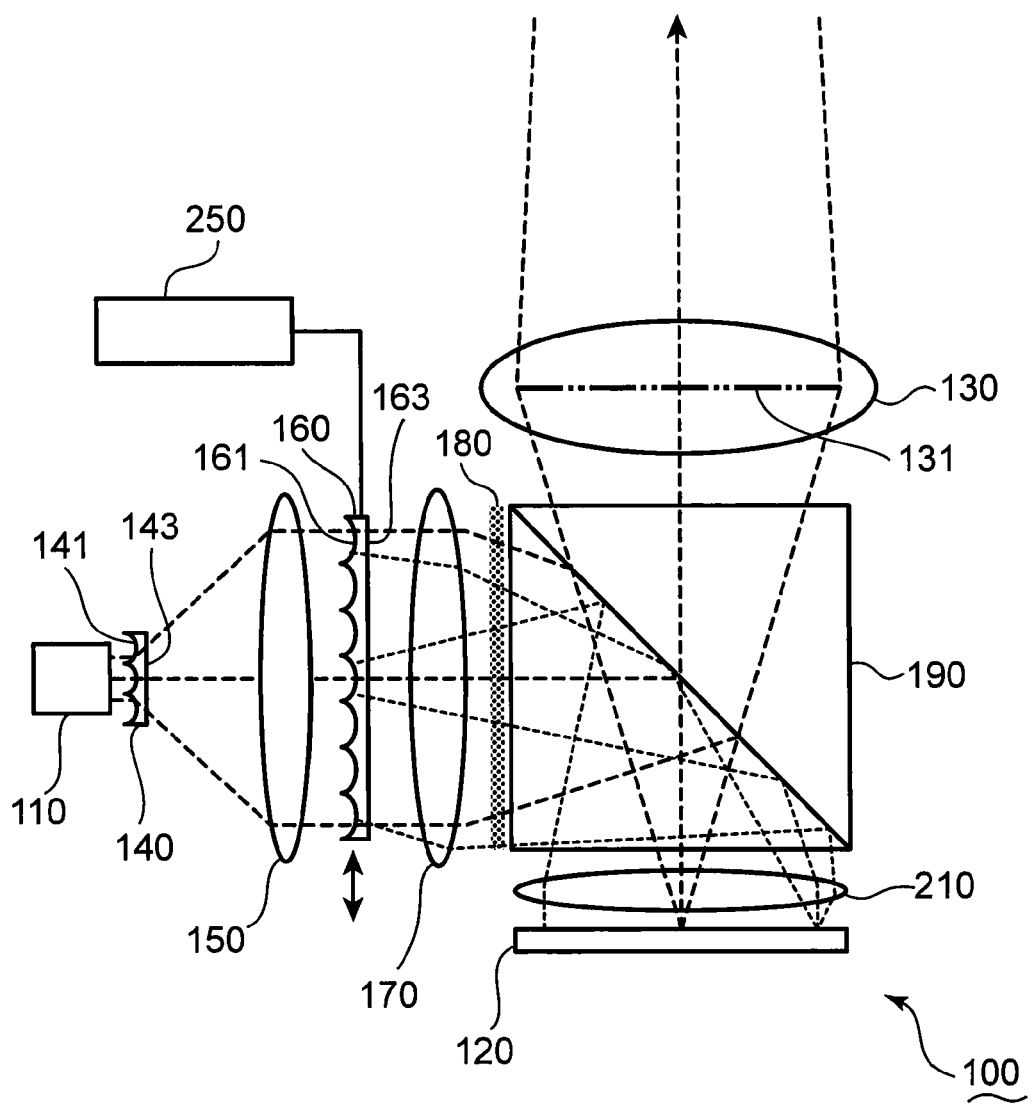
FIG. 1 is a schematic view of a laser projector according to the first embodiment.

A laser projector according to one embodiment of the present is described hereafter with reference to the drawings. It should be noted that in the following embodiment, the same symbols and numerals are assigned to the same components. Redundant descriptions are omitted as appropriate for simplifying the explanation. Configurations, arrangements or shapes shown in the drawings and relevant descriptions to the drawings are provided for the purpose of making principles of the laser projector easily understood. The principles of the laser projector are not limited thereto.

First Embodiment (Laser Projector)

FIG. 1 is a schematic view of a laser projector 100 according to the first embodiment. The laser projector 100 is described with reference to FIG. 1.

The laser projector 100 includes: a laser source 110 which emits a laser beam; a spatial light modulator 120 which modulates the laser beam to generate image light; and a projector lens 130 from which the image light is emitted. In this embodiment, the laser source 110 is exemplified as the laser source section.

An exit pupil 131 of the projector lens 130 is depicted by the thick chain line in FIG. 1. The laser projector 100 further includes a pupil uniformizer 140, which makes a light intensity distribution uniform at the exit pupil 131 of the projector lens 130. The pupil uniformizer 140 includes an incident end surface 141 to which the laser beams emitted from the laser source 110 are incident.

Figure 2:
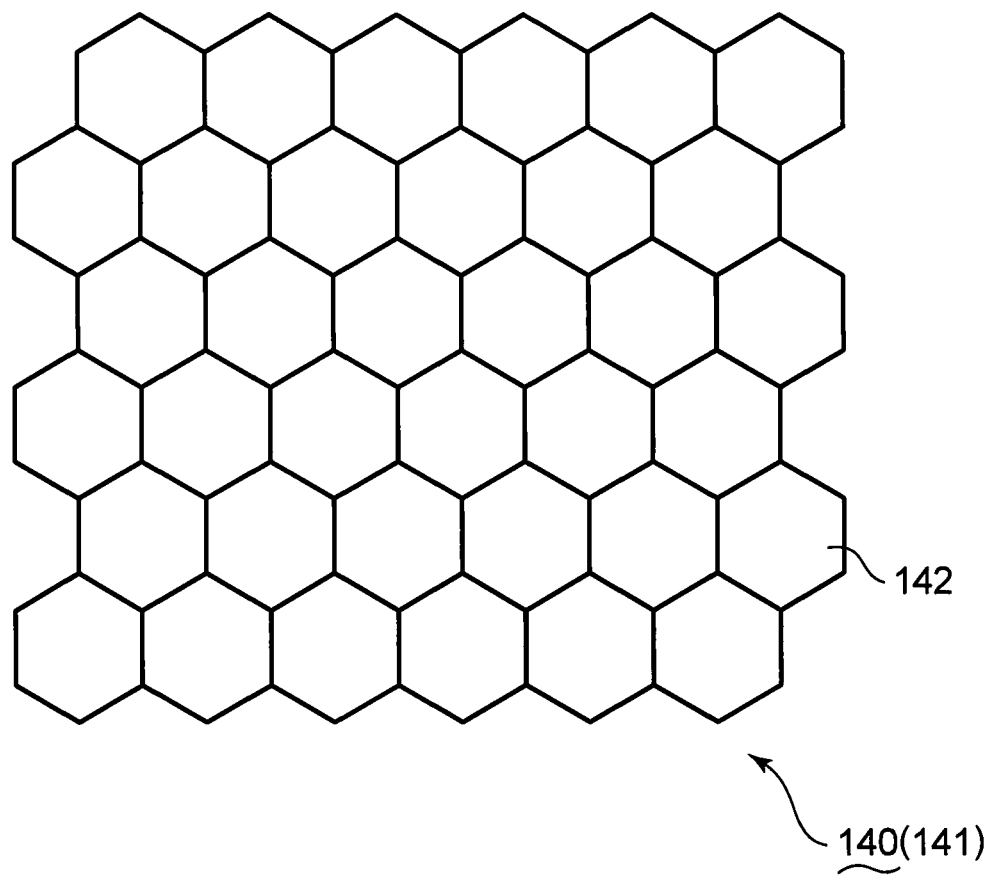
FIG. 2 is a schematic view of a lens pattern formed on an incident end surface of a pupil uniformizer.

FIG. 2 is a schematic view of a lens pattern formed on the incident end surface 141 of the pupil uniformizer 140. The pupil uniformizer 140 and the laser projector 100 are described with reference to FIGS. 1 and 2.

The pupil uniformizer 140 includes several first element lenses 142 formed on the incident end surface 141. A cluster of substantially regular hexagonal first element lenses 142 is formed on the incident end surface 141 so that a light intensity distribution becomes uniform at the exit pupil 131 of the projector lens 130. Thus, a honeycomb structure composed of the first element lens 142 is formed on the incident end surface 141.

The first element lens 142 is a convex lens. The first element lens 142 is preferably a parabolic lens. For example, the first element lens 142 has a lens pitch of "about 0.2 mm", a curvature radius of "about −0.1 mm", and a cone constant of "about −1". The laser beam emitted from the laser source 110 is incident to the concave surface formed on the basis of the aforementioned dimensions.

A beam diameter of the incident laser beam to the incident end surface 141 is at least twice as large as the lens pitch. Accordingly, the laser beam passes through a few first element lenses 142. The concave surface (curved surface) of the aforementioned configuration of the first element lens 142 functionally spreads the laser beam.

The pupil uniformizer 140 includes the incident end surface 141 and an emission end surface 143 opposite to the incident end surface 141. As a result of the spreading function to the laser beams by the concave surface of the first element lens 142, the laser beams are spread and superimposed on each other after the laser beams are emitted from an emission end surface 143. Accordingly, the light intensity distribution appropriately becomes uniform at the exit pupil 131 of the projector lens 130.

An emission angle distribution of the laser beams emitted from the emission end surface 143 is made uniform by the pupil uniformizer 140. An area of the incident end surface 141, into which the laser beam is incident, is called the effective surface. In this embodiment, a cluster of the regular hexagonal first element lenses 142 is formed over the effective surface, so that a flat surface which allows a light flux to pass through is excluded from the effective surface.

The laser projector 100 further includes a collimator 150, which collimates the laser beams emitted from the emission end surface 143, and a beam shaper 160, which shapes the laser beams into a shape of the spatial light modulator 120. The laser beams emitted from the pupil uniformizer 140, which is situated between the laser source 110 and the beam shaper 160, is incident to the collimator 150. The regular hexagonal laser beams emitted from the collimator 150 are then turned into beams of which light intensity is made uniform. The laser beams emitted from the collimator 150 are thereafter incident to the beam shaper 160.

Figure 3:
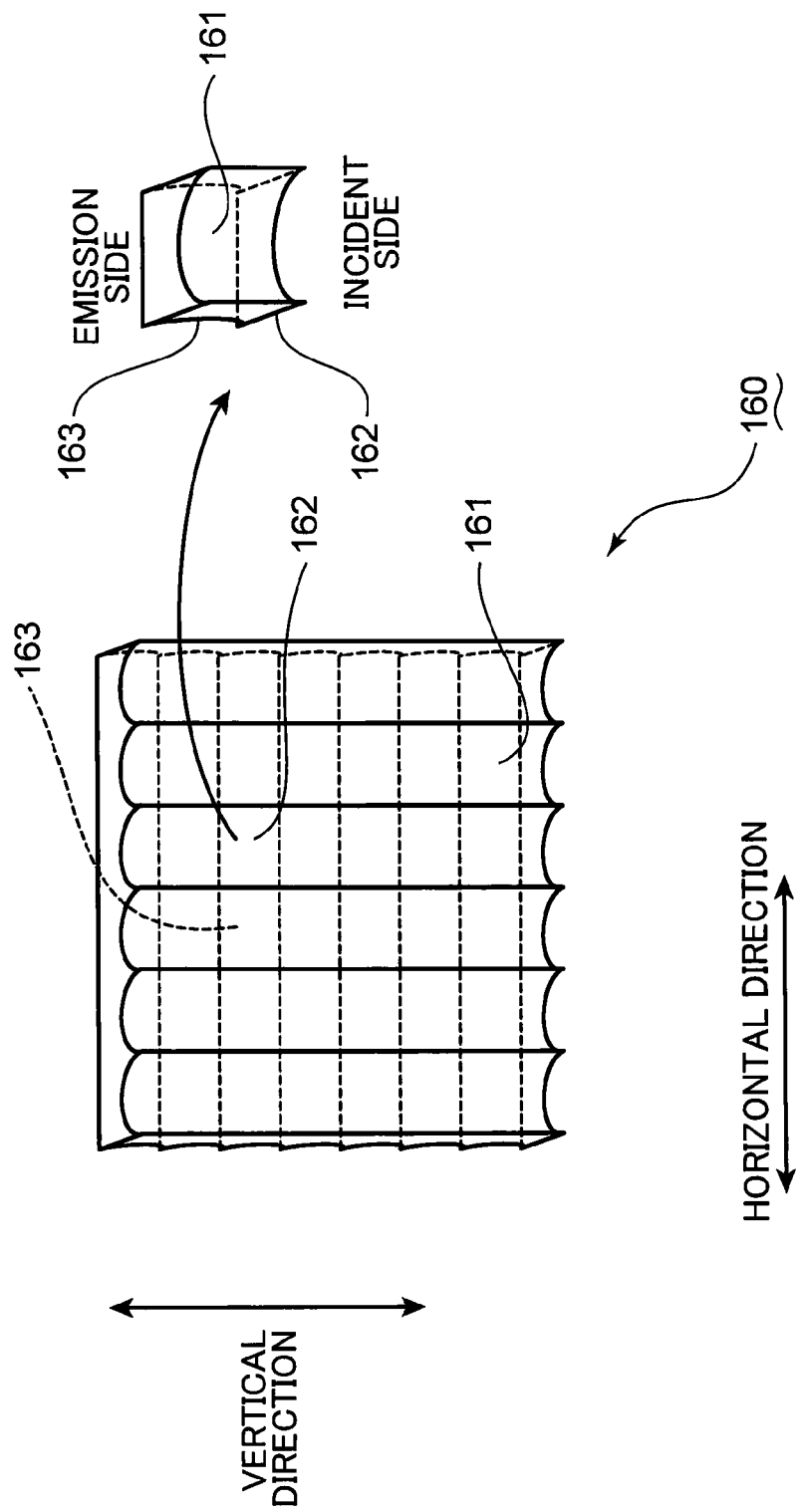
FIG. 3 is a schematic perspective view of a beam shaper.

FIG. 3 is a schematic perspective view of the beam shaper 160. The beam shaper 160 and the laser projector 100 are described with reference to FIGS. 1 and 3.

The beam shaper 160 includes an incident end surface 161, to which the laser beams from the collimator 150 is incident, and an emission end surface 163 opposite to the incident end surface 161.

The left drawing of FIG. 3 shows an overall beam shaper 160. As shown in the left drawing of FIG. 3, a cylindrical lens array, which horizontally curves in response to a curvature radius is formed on the incident end surface 161 of the beam shaper 160. A cylindrical lens array, which vertically curves in response to the curvature radius, is formed on the emission end surface 163 of the beam shaper 160. The cylindrical lens array formed on the incident end surface 161 perpendicularly extends to the cylindrical lens array formed on the emission end surface 163.

The right drawing of FIG. 3 is a schematic perspective view of a substantially rectangular parallelpiped second element lens 162, which is used as a part of the aforementioned cylindrical lens array. A cylindrical lens formed as the incident end surface 161 of the second element lens 162 is "about 0.312 mm" in width, "about −0.2 mm" in curvature radius, and "about −1" in cone constant. The cylindrical lens of the incident end surface 161 forms a paraboloid. The cylindrical lens formed as the emission end surface 163 of the second element lens 162 is "about 0.2 mm" in width, "about −0.2 mm" in the curvature radius, and "about −1" in cone constant. The cylindrical lens of the emission end surface 163 forms a paraboloid.

As shown in the left drawing of FIG. 3, a cluster of the horizontally and vertically aligned second element lenses 162 with convex lenses is formed on the incident end surface 161 and the emission end surface 163, respectively. As a result, the laser beams emitted from the emission end surface 163 are shaped into the shape of the spatial light modulator 120. The area of the incident end surface 161, to which the laser beams are incident, is called the effective surface in the following descriptions. In this embodiment, a cluster of the second element lenses 162 is formed all over the effective surface, so that a flat surface, which allows the light flux to pass through, is excluded from the effective surface.

The laser projector 100 further includes a condenser lens 170, a light diffuser 180, PBS (Polarizing Beam Splitter) 190, and a field lens 210. The laser beams emitted from the beam shaper 160 are condensed by the condenser lens 170, and then pass through the light diffuser 180. The laser beams are diffused by the light diffuser 180 to reduce the speckle noise. The laser beams are then reflected toward the spatial light modulator 120 by the PBS 190, and illuminates the spatial light modulator 120 through the field lens 210.

The beam shaper 160 shapes the laser beam into a beam having a rectangular cross-sectional surface of "4:3 (aspect ratio)". It should be noted that the light intensity distribution of the shaped beam is kept uniform. The spatial light modulator 120 modulates the shaped beam to generate image light. In this embodiment, a reflective type spatial modulation element is used as the spatial light modulator 120. More specifically, LCOS, which is diagonally 0.37 inches, is assembled as the spatial light modulator 120 into the laser projector 100. The image light generated by the spatial light modulator passes through the field lens 210 and the PBS 190, and eventually is emitted from the projector lens 130.

(Making Light Intensity Distribution Uniform)

Figure 4:
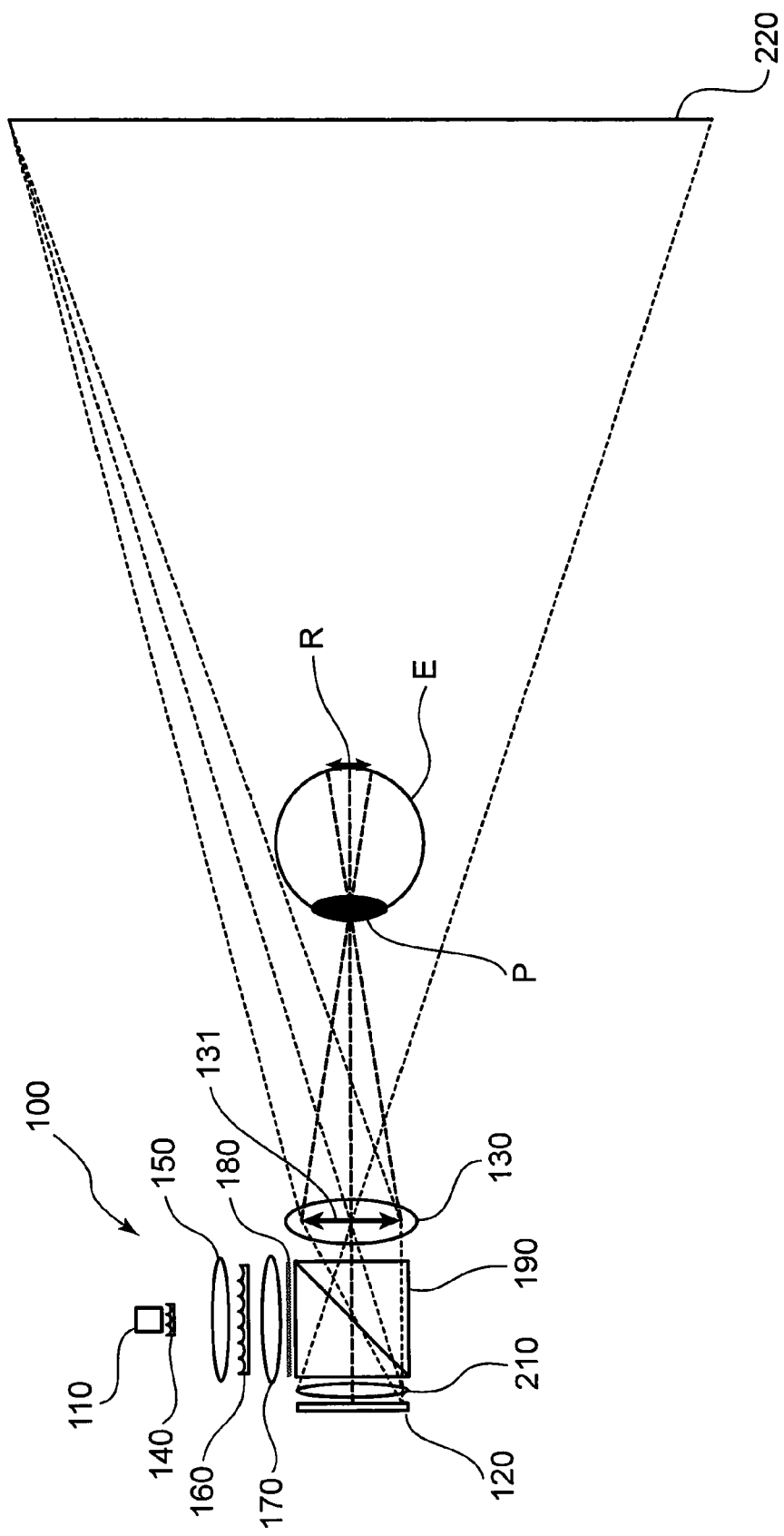
FIG. 4 is a schematic view showing a positional relationship between the laser projector and an eye of a viewer.

FIG. 4 is a schematic view showing a positional relationship between the laser projector 100 and the eye E of a viewer. It is described how to make the light intensity distribution uniform with reference to FIGS. 1 to 4.

The image light emitted from the projector lens 130 is projected toward a display surface 220 such as a screen. FIG. 4 shows the eye E of the viewer who gazes the laser projector 100. The viewer gazes into the projector lens 130 of the laser projector 100. Accordingly, the image light reaches the retina R through the pupil P of the viewer. As shown in FIG. 4, if the viewer gazes into the projector lens 130, the light is the most intensive when an image at the exit pupil 131 is reflected on the retina R.

Meanwhile, if the light intensity distribution at the exit pupil 131 has an excessively intensive portion, the retina R is subjected to an intensive light spot. It is not preferable in terms of safety that the retina is subjected to the intensive light spot.

Figure 5A:
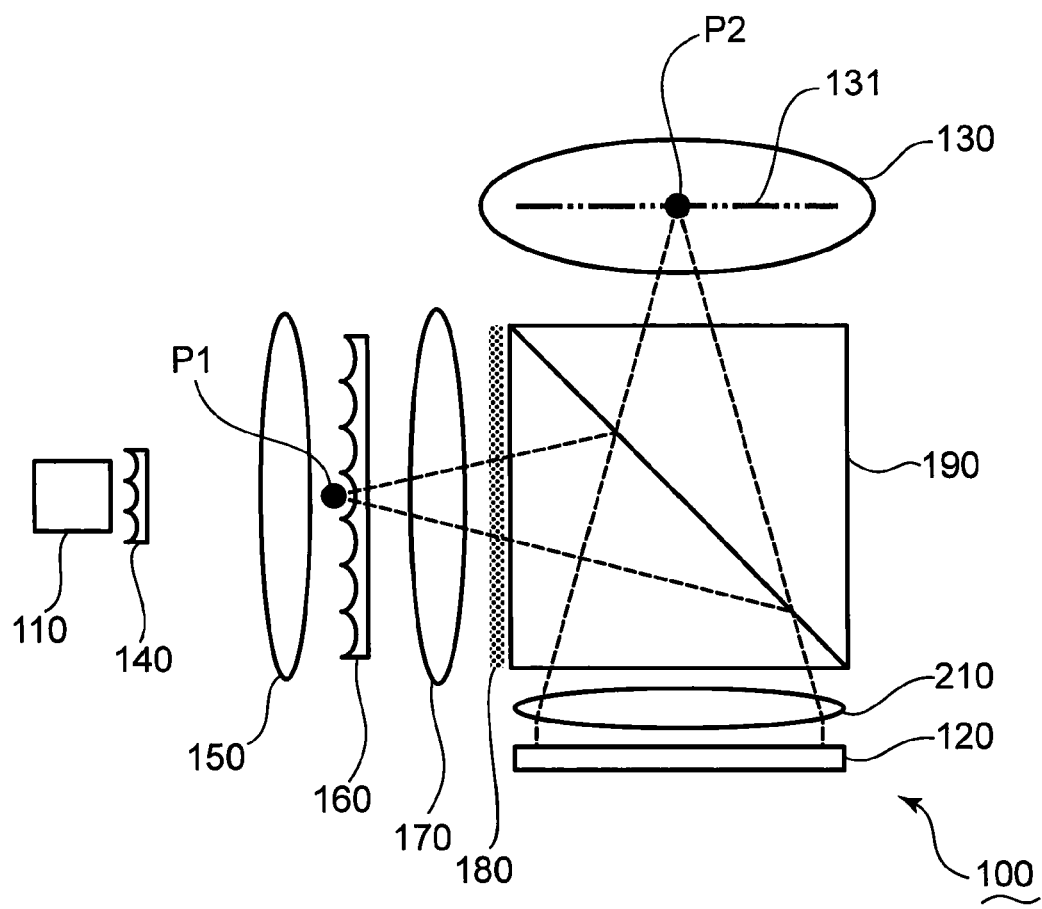
FIG. 5A is a schematic view showing a positional relationship between the beam shaper and an exit pupil.
Figure 5B:
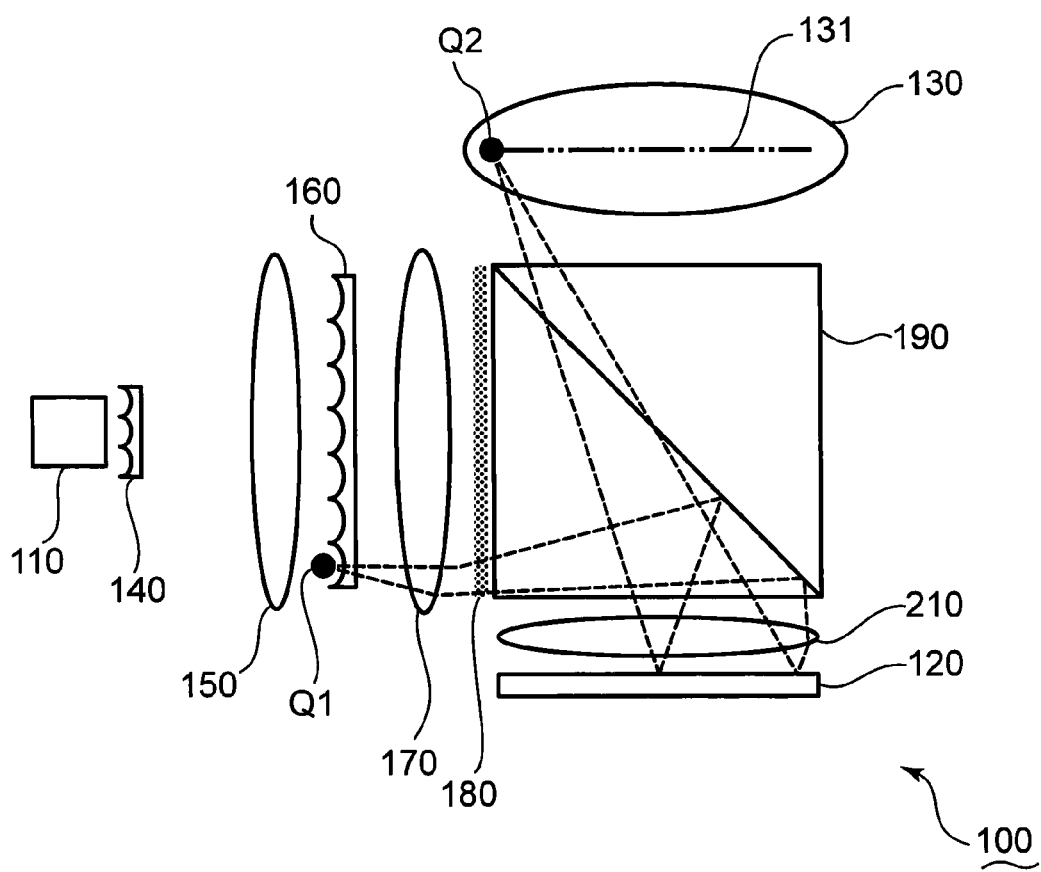
FIG. 5B is a schematic view showing the positional relationship between the beam shaper and the exit pupil.

FIGS. 5A and 5B are schematic views showing a positional relationship between the beam shaper 160 and the exit pupil 131. It is further described how to make the light intensity distribution uniform with reference to FIGS. 2 to 5B.

A conjugated relationship is made between the beam shaper 160 and the exit pupil 131. The conjugated relationship means a positional relationship in which the light generated from one of two points forms an image on the other point.

A virtual point P1 at substantially the center of the beam shaper 160 and a virtual point P2 at substantially the center of the exit pupil 131 are shown in FIG. 5A. The light generated at the virtual point P1 passes through the condenser lens 170, the light diffuser 180, the PBS 190, and the field lens 210, and then reaches the spatial light modulator 120. The spatial light modulator 120 reflects the light from the virtual point P1. The light reflected by the spatial light modulator 120 then passes through the field lens 210 and the PBS 190, and eventually forms an image at the virtual point P2 which is situated at substantially the center of the exit pupil 131 of the projector lens 130.

FIG. 5B shows a virtual point Q1 at an edge of the beam shaper 160 and a virtual point Q2 at an edge of the exit pupil 131. The light generated at the virtual point Q1 passes through the condenser lens 170, the light diffuser 180, the PBS 190, and the field lens 210, and then reaches the spatial light modulator 120. The light from the virtual point Q1 is reflected by the spatial light modulator 120. The light reflected by the spatial light modulator 120 then passes through the field lens 210 and the PBS 190, and eventually forms an image at the virtual point Q2 which is situated at the edge of the exit pupil 131 of the projector lens 130.

As shown in FIGS. 5A and 5B, the conjugated relationship is made between the exit pupil 131 of the projector lens 130 and the beam shaper 160. Therefore, the intensity distribution of the incident light to the beam shaper 160 is reflected over the exit pupil 131 of the projector lens 130. As described above, the light intensity distribution of the incident laser beam to the beam shaper 160 is made uniform by the pupil uniformizer 140. This means that the intensity distribution of the laser beam is made uniform at the exit pupil 131 by the pupil uniformizer 140.

As described above, the light intensity distribution of the image light at the exit pupil of the projector lens 130 is made uniform by the pupil uniformizer 140. Therefore, it becomes less likely that the retina R is subjected to an excessively intensive light spot. Accordingly, even if the viewer accidentally gazes into the projector lens 130 of the laser projector 100, the laser projector 100 may safely project the image light.

The light intensity of the image at the exit pupil 131 reflected on the retina R of the eye E depends on an incident light quantity to the pupil P of the eye E. The light intensity on the retina R goes up as the light quantity incident to the pupil P of the eye is increased. For example, if there is the brightest illumination at the center of the display surface 220 and if the viewer gazes into the projector lens 130 between the projector lens 130 and the center of the display surface 220, the light quantity incident to the pupil P is increased. Meanwhile, for example, if an image with low luminance is displayed in the periphery of the display surface 220 and if the viewer gazes into the projector lens 130 between the projector lens 130 and the periphery of the display surface 220, the light quantity incident on the pupil P is decreased. Without any portion in which there is excessively increased incident light to the pupil P, the laser projector 100 surely becomes safe.

The incident light quantity to the spatial light modulator 120 is made uniform by the beam shaper 160 of this embodiment, so that an excessively bright portion does not happens to the display surface 220. Accordingly, even if the viewer gazes into the projector lens 130 at any position between the projector lens 130 and the display surface 220, the incident light quantity to the pupil P is not excessively increased. Accordingly, the laser projector 100 may safely project the image light.

As described above with reference to FIG. 2, the pupil uniformizer 140 includes the effective surface on which there is a cluster of the first element lenses 142. The pupil uniformizer 140 uses a refraction effect at the effective surface without a planar portion to make the light intensity uniform at the exit pupil 131.

The beam shaper 160 has the effective surface on which the second element lenses 162 are clustered. The beam shaper 160 uses the refraction effect at the effective surface without a planar portion to shape the beam into a shape of the spatial light modulator 120.

Accordingly, the pupil uniformizer 140 and the beam shaper 160 make the light intensity uniform and shape the beam without causing a 0-order component. It should be noted that the 0-order light component is generated under usage of a holographic element and a diffraction element.

Without the clustered first and second element lenses, the effective surface includes the planar surface. If the effective surface includes the planar portion, the 0-order component is generated even if a lens array is formed from fine element lenses. The 0-order light component results in remarkably high peak intensity. Accordingly, the retina of the viewer's eye is subjected to an extremely intensive light spot because of the generation of the 0-order light component if the viewer gazes into the projector lens. This is not preferable in terms of safety.

In this embodiment, the first and second element lenses 142, 162 are clustered over the effective surfaces of the pupil uniformizer 140 and the beam shaper 160, respectively. Therefore, it becomes less likely that there is the resultant portion of excessively intensive light from the 0-order light component. It should be noted that the term "planar portion" means a flat portion which is flat in both an incident surface and an emission surface of the laser beam. The term "effective surface" means a region through which the laser beam is transmitted as described above.

The pupil uniformizer 140 uses a refractive force of the first element lenses 142, from which the laser beams are spread and superimposed on each other, respectively. Thus, the pupil uniformizer 140 may make the light intensity uniform by itself.

The beam shaper 160 uses a refractive force of the second element lenses from which the laser beams are spread and superimposed on each other, respectively. Accordingly, the beam shaper 160 may shape the beam by itself.

The pupil uniformizer 140 removes the speckle noise while the pupil uniformizer 140 makes the light intensity uniform. The speckle noise is perceived by the viewer viewing the display surface 220. A magnitude of the speckle noise depends on the light intensity distribution at the exit pupil 131 of the projector lens 130. In this embodiment, the pupil uniformizer 140 makes the light intensity distribution uniform at the exit pupil 131 of the projector lens 130. Therefore, the speckle noise is also properly reduced. The pupil uniformizer 140 may make the light intensity uniform up to the periphery of the exit pupil 131, in response to the curvature of the concave surface of the first element lens 142. Accordingly, the pupil uniformizer 140 may appropriately make the uniform intensity of the light having a light quantity distribution in correspondence to the Gaussian distribution.

As described above, the beam shaper 160 makes the light quantity distribution uniform at the display surface 220. The speckle noise is noticeable in a display region with increased light quantity (namely, the speckle noise is easily perceived by the viewer). In this embodiment, a light quantity distribution on the display surface 220 is made uniform by the beam shaper 160. Therefore, it is less likely that there is a display region with noticeable speckle noise.

The laser projector 100 includes the laser source 110; the spatial light modulator 120; the projector lens 130; the pupil uniformizer 140, which makes the light intensity distribution uniform at the exit pupil 131 of the projector lens 130; and the beam shaper 160, which shapes the laser beam. The pupil uniformizer 140 has the effective surface over which the first element lenses 142 are clustered. The beam shaper 160 has the effective surface over which the second element lenses 162 are clustered. Accordingly, the laser projector 100 may not only appropriately make the light intensity distribution uniform at the exit pupil 131 of the projector lens 130, but also make the light quantity distribution uniform at the display surface 220. It should be noted that the laser projector 100 makes both of the light intensity and quantity distributions uniform without generating the 0-order light component. Accordingly, it becomes less likely that the retina R of the viewer's eye E is subjected to an excessively intensive light spot even if the viewer gazes into the projector lens 130. As a result of the uniform light intensity distribution at the exit pupil 131 and the uniform light quantity distribution over the display surface 220, the speckle noise is appropriately reduced. Thus, an image reflected on the display surface 220 has few regions in which there is noticeable speckle noise.

The pupil uniformizer 140 of the laser projector 100 is situated between the laser source 110 and the beam shaper 160. The incident laser beams to the pupil uniformizer 140 are spread in response to a spreading angle of the first element lenses 142. As a result, the laser beams emitted from the first element lenses 142 are superimposed on each other, and then the superimposed laser beams are incident to the beam shaper 160, which results in the uniform light intensity distribution. The laser beams are superimposed on each other by a lens power of the first element lenses 142 even if different light quantities of the laser beams are incident to the first element lenses 142 of the pupil uniformizer 140. Therefore, the pupil uniformizer 140 makes the light intensity uniform by itself. The laser beams with the uniform light intensity are incident to the beam shaper 160, which is set in the conjugated relationship with the exit pupil 131 of the projector lens 130. Accordingly, even if the laser projector 100 is miniaturized, the light intensity becomes uniform at the exit pupil 131.

The first element lenses 142 of the pupil uniformizer 140 and the second element lenses 162 of the beam shaper 160 are both concave lenses. The pupil uniformizer 140 and the beam shaper 160 include the lens array formed of these concave lenses. The first and second element lenses 142, 162 superimpose the laser beams in a short optical path length to make the light intensity and/or quantity uniform. Accordingly, the pupil uniformizer 140 and the beam shaper 160, which include the lens array formed of these concave lenses, contribute to designing a compact optical system.

Shapes of the first element lenses 142 used for the lens array are preferably the same or similar shapes to each other. If the first element lenses 142 having the same or similar shapes are used for the lens array, a curvature distribution in a diameter direction becomes uniform. As a result, an emission angle distribution and a light intensity distribution of the laser beams emitted from the lens array become uniform.

Shapes of the second element lenses 162 used for the lens array are preferably the same or similar shapes to each other. If the second element lenses 162 having the same or similar shapes are used for the lens array, a curvature distribution in a diameter direction becomes uniform. As a result, the emission angle distribution and the light intensity distribution of the laser beams emitted from the lens array become uniform.

Convex curved surfaces (lens surfaces) of the first element lenses 142 of the pupil uniformizer 140 have a curvature distribution in which the curvature is reduced as a distance from the center is lengthened. Convex curved surfaces (lens surfaces) of the second element lenses 162 of the beam shaper 160 have a curvature distribution in which the curvature is reduced as a distance from the center is lengthened. More preferably, the first and second element lenses 142, 162 have curved surfaces so that spherical aberrations are corrected by means of a cone constant or a second-order aspheric coefficient.

Figure 6:
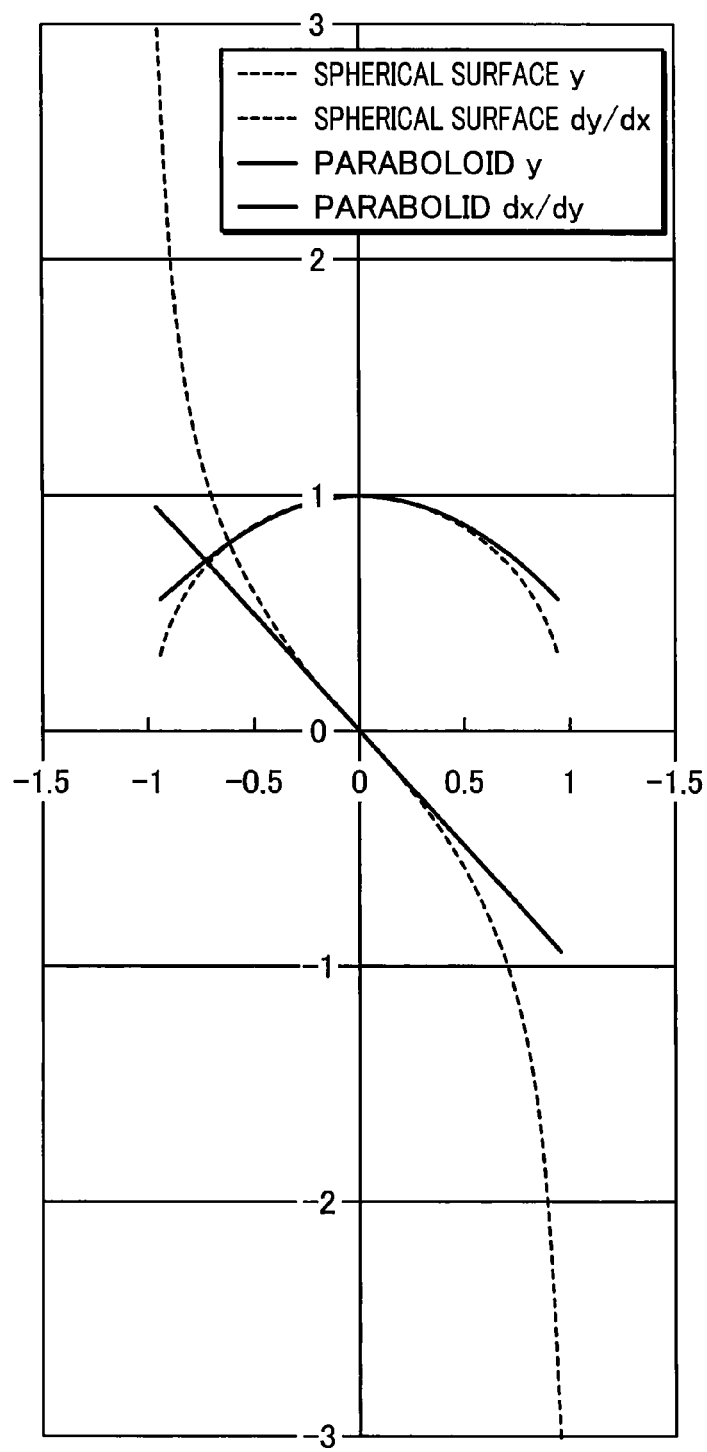
FIG. 6 is a graph schematically showing angular orientation characteristics of a spherical surface and a paraboloid.

The first element lenses 142 are convex parabolic lenses. The curvature becomes small toward the contour of the first element lenses 142. The second element lenses 162 have cylindrical lenses on the incident end surface 161 and the emission end surface 163, respectively. An axis of the cylindrical lens formed on the incident end surface 161 orthogonally crosses an axis of the cylindrical lens formed on the emission end surface 163. Curvatures of both cylindrical lenses gradually become smaller toward the contour of these lenses. In this embodiment, the spherical aberration is corrected by means of the paraboloid with cone constant FIG. 6 is a graph schematically showing angular orientation characteristics of a spherical surface and a paraboloid. Differences in the orientation characteristics between the spherical surface and the paraboloid are described with reference to FIGS. 1, 3, 4 and 6.

The shape (y) and the surface tilt (dy/dx) in a diameter direction of the spherical surface with a curvature radius of "1" are expressed by the dot-line in FIG. 6. The shape (y) and the surface tilt (dy/dx) in a diameter direction of the paraboloid with a curvature radius of "1" are expressed by the solid line. It should be noted that the horizontal axis in the graph of FIG. 6 indicates the diameter direction.

With regard to the spherical surface, if a value in the diameter direction becomes larger, the surface tilt also becomes large, so that the value of the surface tilt eventually diverges. On the other hand, with regard to the curved surface (i.e., the paraboloid) with curvature becoming smaller as it is distant from the center of the lens, the surface tilt is not larger than the spherical surface, even if the value in the diameter direction becomes large.

The emission angle distributions of the pupil uniformizer 140 and the beam shaper 160 according to this embodiment depend on the curvature distribution of the first and second element lenses 142, 162, respectively. Since the emission angle distribution of the pupil uniformizer 140 of the laser projector 100 becomes uniform, the light intensity also becomes uniform at the exit pupil 131 of the projector lens 130. Since the emission angle distribution of the beam shaper 160 becomes uniform, the light quantity distribution for illuminating the spatial light modulator 120 also becomes uniform. The surface tilts in the diameter direction of the first and second element lenses 142, 162 are controlled so as to make the emission angle distribution uniform. If the laser projector 100 is compact, the laser projector 100 requires a compact optical system. Therefore, divergent angles of the first and second element lenses 142, 162 are preferably set to be large. If the divergent angles are set to be large, a length in an optical axis direction is preferably shortened.

For example, in the case of the spherical surface, the surface tilt in the diameter direction becomes substantially linear in a range of small values in the diameter direction (i.e., in a range of small divergent angles), so that a substantially uniform emission angle distribution may be obtained. If the values in the diameter direction become large (i.e., if the divergent angles become large), as shown in FIG. 6, however, the surface tilt in the diameter direction diverges, which results in decreased intensity of the light with large emission angle.

On the other hand, as shown in the paraboloid of FIG. 6, if the curvature becomes smaller as it is distant from the center of the lens, the linear relationship of the surface tilt in the diameter direction is maintained even if the values in the diameter direction become large (i.e., even if the divergent angles become large), which results in a uniform emission angle distribution.

Since the first and second element lenses 142, 162 are parabolic with spherical aberrations corrected by means of the cone constant, the uniform emission angle distribution may be obtained even if the divergent angles of the first and second element lenses 142, 162 are set to be large, which results in a suitable compact optical system for the laser projector 100.

In this embodiment, the first and second element lenses 142, 162 include the paraboloids. Alternatively, other surface shape may be employed, wherein the curvature becomes smaller as it is distant from the center of the lens. Even in such a surface shape, similarly, the diversification of the surface tilt in the diameter direction (c.f., a graph of the spherical surface of FIG. 6) is suppressed to achieve a uniform emission angle distribution. The lens having the curved surface with spherical aberration corrected by means of the cone constant or the second-order aspheric coefficient does not include a deflection point. Accordingly, it becomes less likely that such a lens condenses the light quantities at the deflection point. Correction on the curved surface of lens by means of a high-order aspheric coefficient such as a 4-th order aspheric coefficient results in the deflection point. The deflection point makes it difficult to fabricate the first and second element lenses in addition to causing the unfavorable condensation of the light quantities as described in this embodiment. As a result, it becomes expensive to fabricate the first and second element lenses.

The laser beams, which are emitted from the beam shaper 160 of the laser projector 100, are spread and superimposed on each other in response to the curvature distribution (divergent angles) of the second element lenses 162. As a result, the laser beams are shaped into the shape of the spatial light modulator 120. The superimposed laser beams are incident to the light diffuser 180. The laser beams are then incident to the spatial light modulator 120.

As described above, the beam shaper 160 of the laser projector 100 is positioned so as to keep the conjugated relationship with the exit pupil 131 of the projector lens 130. The beam shaper 160 is formed from the second element lenses 162. The light condensation at the focal points of the second element lenses 162 is sometimes observed at the exit pupil 131 of the projector lens 130 under absence of the light diffuser 180. The light condensation at the focal point of the second element lenses 162 sometimes causes an intensive light spot at the exit pupil 131 of the projector lens 130 under the absence of the light diffuser 180. In this embodiment, the light diffuser 180 is situated between the beam shaper 160 and the spatial light modulator 120. As a result, it becomes less likely that the light condensation at the focal points of the second element lenses 162 is observed at the exit pupil 131 of the projector lens 130. The light diffuser 180 is situated at a position where the beams from the second element lenses 162 are superimposed on each other. The aforementioned arrangement of the diffuser 180 preferably makes it difficult to observe the light condensation at each focal point of the second element lenses 162. Thus, the light intensity becomes uniform at the exit pupil 131 of the projector lens 130 according to the principles of this embodiment. As a result, the laser projector 100 may safely display quality images with little speckle noise.

In this embodiment, the spatial light modulator 120 of the laser projector 100 is a reflective type spatial light modulator. LCOS is exemplified as the reflective type spatial light modulator. The laser beams emitted from the beam shaper 160 are passed through the condenser lens 170 and the field lens 210, and then are incident to the spatial light modulator 120. Thereafter, the laser beams are reflected by the spatial light modulator 120. The reflected laser beams are passed through the field lens 210, and eventually projected on the display surface 220 from the projector lens 130.

The condenser lens 170 makes a focal point near the spatial light modulator 120. The condenser lens 170 entirely irradiates the spatial light modulator 120 (up to the periphery of the spatial light modulator 120) with the laser beams shaped by the beam shaper 160, in the uniform light intensity distribution.

The field lens 210 situated immediately before the spatial light modulator 120 guides the light reflected from the periphery of the spatial light modulator 120 to the projector lens. Optical paths between the reflective type spatial light modulator (spatial light modulator 120) and the projector lens 130 are overlapped on the illumination optical system. Accordingly, the projector lens 130 may not be situated near the spatial light modulator 120. Without the field lens 210, it is difficult for the projector lens 130 to capture the image light reflected from the periphery of the reflective type spatial light modulator 120. Unless the projector lens 130 captures the image light reflected from the periphery of the reflective type spatial light modulator 120, it is likely that the displayed image at the periphery of the display surface 220 becomes dark.

In this embodiment, the light intensity becomes uniform at the exit pupil 131 of the projector lens 130. Accordingly, it becomes likely that the projector lens 130 captures less reflection light from the periphery of the spatial light modulator 120 under absence of the field lens 210. It is likely that the field lens 210 prevents the capture amount from decreasing.

As described above, the condenser lens 170 entirely irradiates the spatial light modulator 120 (up to the periphery of the spatial light modulator 120), with the uniform light intensity distribution in this embodiment. The field lens 210 increases the capture amount of the light reflected from the periphery of the spatial light modulator 120. Accordingly, the bright image is displayed near the periphery of the display surface 220 according to the principles of this embodiment without making the image remarkably bright at the center of the display surface 220 in comparison with the image at the periphery of the display surface 220. Excessively bright display at the center of the display surface 220 means not only deterioration of an image but also the deterioration of the safety. The laser projector 100 of this embodiment may safely display a bright image near the periphery of the display surface 220.

Numerical apertures of the second element lenses 162 of the beam shaper 160 described with reference to FIG. 3 is described below. The numerical aperture of the cylindrical lens on the incident end surface 161 is NA 0.35 in the horizontal direction. The numerical aperture of the cylindrical lens on the emission end surface 163 is NA 0.26 in the vertical direction. The numerical aperture of the rectangular second element lenses 162 in the diagonal direction is NA 0.44. In this embodiment, the maximum numerical aperture of the second element lenses 162 of the beam shaper 160 is preferably set to no less than 0.3.

In this embodiment, it depends on the divergent angle defined by the numerical aperture of the second element lenses 162 to shape the beams. If the numerical aperture of the second element lenses 162 is set to be large, it takes a short optical distance to shape the beam. Accordingly, if the maximum numerical aperture of the second element lens 162 is set to no less than 0.3, the laser projector 100 is preferably miniaturized. As described above, the curvature of the curved surface is preferably set to be smaller, as it is distant from the center of the second element lenses 162. In particular, the curved surface of the second element lenses 162 preferably becomes parabolic.

As shown by the graph (dy/dx) of FIG. 6, if a refractive index of the second element lenses 162 is 1.5, the numerical aperture of "0.3" corresponds to "0.54" in a radius of the horizontal axis of FIG. 6 with respect to the spherical surface, and corresponds to the value "0.64" with respect to the paraboloid. If the numerical aperture exceeds "0.3", with respect to the spherical surface, the tilt (dy/dx) to the radius diverges. This means that the diversion of the shaped beam and the reduction in the intensity of the shaped beam. On the other hand, with respect to the paraboloid, even if the numerical aperture exceeds "0.3", the tilt to the radius is linearly varied to maintain the uniform beam intensity. If the second element lenses 162 have the maximum numerical aperture of 0.3 or more and if the curved surface with curvature becoming smaller as it is distant from the center of the lens, the laser projector 100 may become compact and uniformly shape the beams.

As shown in FIG. 1, the laser projector 100 further includes an actuator 250 configured to hold the beam shaper 160. The actuator 250 causes reciprocal movement of the beam shaper 160 (frequency: 120 Hz, maximum amplitude: 100 μm) along a perpendicular surface to the optical axis (in the direction indicated by the arrow in FIG. 1), which is defined between the laser source 110 and the spatial light modulator 120. The laser beams passing through the beam shaper 160 are incident to the spatial light modulator 120 through the light diffuser 180. In this embodiment, the actuator 250 is exemplified as the movement mechanism. An electromagnetic coil actuator, a motor actuator and another actuator configured to cause the aforementioned reciprocal movement of the beam shaper 160 are exemplified as the actuator 250.

The actuator 250 preferably causes the reciprocal movement of the beam shaper 160 at the maximum amplitude which is set to be smaller than the minimum sectional dimension "200 μm" of the second element lenses 162. It should be noted that the term "minimum sectional dimension" means a length dimension which is a shorter dimension of the line segments that connects opposed edges of the rectangular cross-sectional surfaces of the second element lenses 162.

Various movement mechanisms are proposed for moving the optical element to reduce the speckle noise. The laser projector 100 of this embodiment has a suitable structure to reduce the speckle noise, so that the actuator 250 may set small movement amplitude of the beam shaper 160. Accordingly, the laser projector 100 may use the compact actuator 250 with low power consumption to reduce the speckle noise.

In this embodiment, the laser beams spreading from the second element lenses 162 are shaped into the shape of the spatial light modulator 120 and superimposed on each other. The superimposed laser beams then passes through the light diffuser 180 to illuminate the spatial light modulator 120. After the laser beams from the second element lenses 162 are superimposed on each other, the laser beams passes through the light diffuser 180, so that an image from the light source is spread in a larger size than a size of each of the corresponding second element lenses 162. The speckle noise removal by the actuator 250 means that light source images of the second element lenses 162 are moved and overlapped on each other as a result of time integration with the adjacent light source images. As described above, the light diffuser 180 spreads the light source images of the second element lenses 162 in a larger size than the size of each second element lens 162. Therefore, the speckle noise may be sufficiently removed even if the amplitude of the reciprocal movement by the actuator 250 is set to be smaller than the minimum sectional dimension of the second element lens 162. Thus, the laser projector 100 may use the compact actuator 250 with low power consumption to reduce the speckle noise.

In the following descriptions, F-number of the projector lens 130 is expressed by the symbol "F#". A longitudinal beam diameter of the incident laser beam to the beam shaper 160 is expressed by the symbol "D". A combined focal distance of the condenser lens 170 with the field lens 210 is expressed by the symbol "f". In this embodiment, the condenser lens 170 and the field lens 210 are exemplified as the lens group.

An optical design of the laser projector 100 according to this embodiment preferably satisfies the relationship shown by the following formula.

$$F\# < f/D < 2 \times F\# \quad \text{(Formula 1)}$$

In this embodiment, the F# of the projector lens 130 of the laser projector 100 is "1.4". The longitudinal beam diameter D of the incident laser beam to the beam shaper 160 is "6 mm". The combined focal distance f of the condenser lens 170 with the field lens 210 is 10 mm.

If the value of "f/D" is smaller than "F#", the projector lens 130 may insufficiently capture the reflected light from the spatial light modulator 120, which results in large light quantity loss and inefficient light utilization. The value of "f/D", which is larger than "2×F#", means that only a center region of the exit pupil 131 of the projector lens 130 is used to emit the image light. The laser projector 100 of this embodiment is optically designed so that the relationship expressed by the aforementioned formula is satisfied. Therefore, the image light may be safely projected under efficient light utilization.

Second Embodiment

Figure 7:
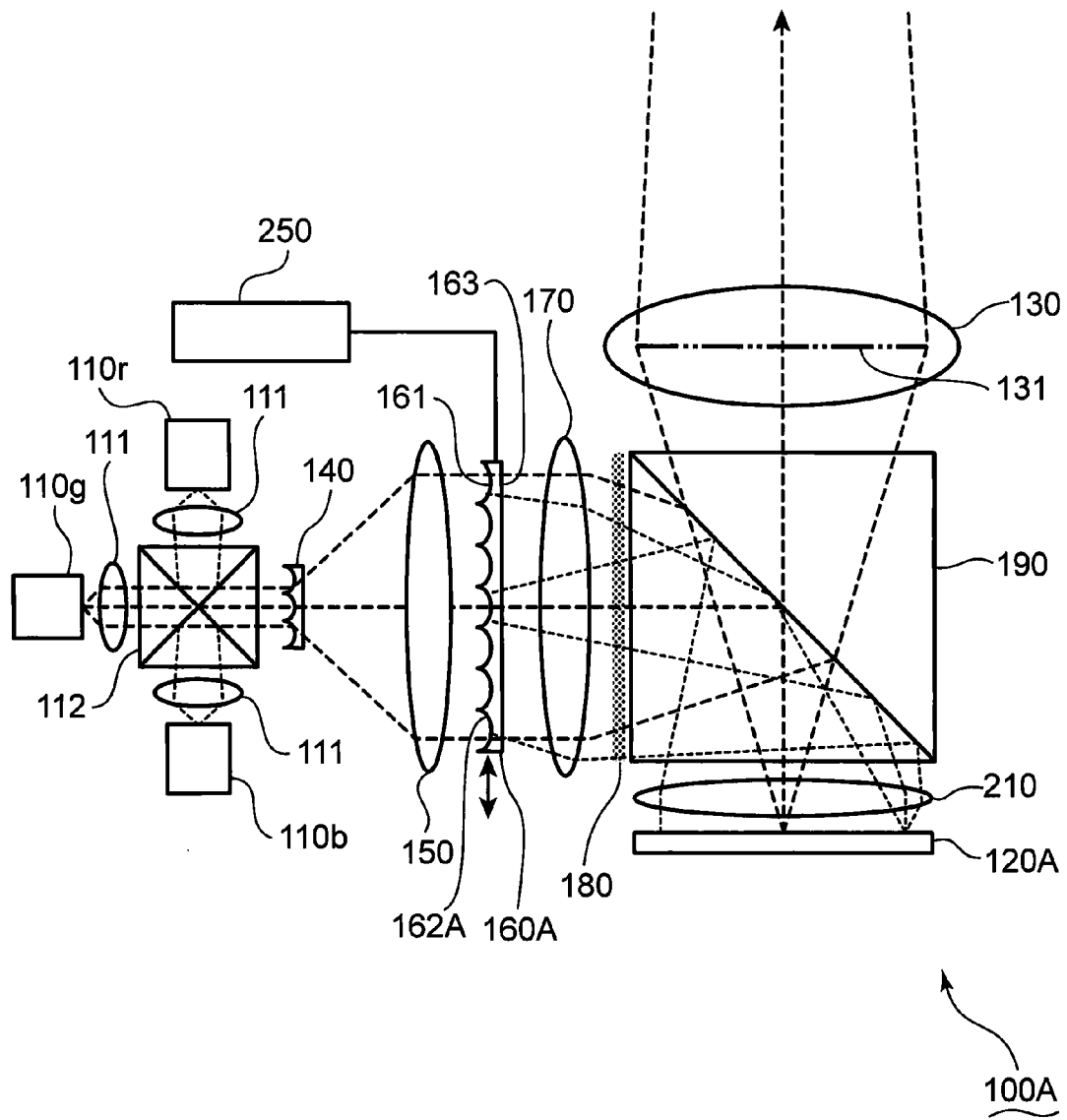
FIG. 7 is a schematic view of a laser projector according to the second embodiment.

FIG. 7 is a schematic view of a laser projector 100A according to the second embodiment. The laser projector 100A is described with reference to FIG. 7. It should be noted that the similar symbols and numerals are assigned to the similar components described in the first embodiment. Descriptions about the similar components are omitted.

Like the laser projector 100 of the first embodiment, the laser projector 100A includes the pupil uniformizer 140, the collimator 150, the condenser lens 170, the light diffuser 180, the PBS 190, the field lens 210, the projector lens 130 and the actuator 250. The laser projector 100A further includes a red laser source 110r, which emits a red laser beam, a green laser source 110g, which emits a green laser beam, and a blue laser source 110b, which emits a blue laser beam. In this embodiment, the red, green and blue laser sources 110r, 110g, 110b are exemplified as the laser source section.

The laser projector 100A further includes collimators 111, which corresponds to the red, green and blue laser sources 110r, 110g, 110b, respectively, and a multiplex prism 112 situated among the collimators 111. The laser beams emitted form the red, green and blue laser sources 110r, 110g, 110b are collimated by the collimators 111, respectively. The multiplex prism 112 then makes the laser beams coaxial.

The laser projector 100A further includes a spatial light modulator 120A which modulates the laser beams to generate the image light. In this embodiment, LCOS (aspect ratio 16:9) is suitably used as the spatial light modulator 120A. The spatial light modulator 120A modulates the red, green and blue laser beams under the time division methodology. Accordingly, emission timings of the laser beams from the red, green and blue laser sources 110r, 110g, 110b are synchronized with the modulating operation of the spatial light modulator 120A. Namely, the emission operations of the red, green and blue laser sources 110r, 110g, 110b may be sequentially switched.

The laser projector 100A further includes a beam shaper 160A configured to shape the laser beam into the shape of the spatial light modulator 120A. The coaxial laser beam generated by the multiplex prism 112 passes through the pupil uniformizer 140, the collimator 150, the beam shaper 160A, the condenser lens 170, the light diffuser 180, the PBS 190 and the field lens 210, and then illuminates the spatial light modulator 120A.

The beam shaper 160A includes the incident end surface 161, to which the laser beam from the collimator 150 is incident, and the emission end surface 163 opposite to the incident end surface 161. The beam shaper 160A is formed from rectangular second element lenses 162A, which are horizontally and vertically clustered. The second element lenses 162A have an aspect ratio of "16:9", like the spatial light modulator 120A.

A concave paraboloid (lens surface) is formed on the incident end surface 161 of the second element lenses 162A. Each substantially rectangular parallelpiped second element lens 162A is "about 0.32 mm" in width and "about 0.18 mm" in height. The curvature radius of the lens surface of the second element lens 162A is "about −0.2 mm", and the cone constant is "about −1". The laser beams emitted from the second element lenses 162A are spread in response to the divergent angle of the second element lenses 162A and superimposed on each other, so that the laser beams are shaped into rectangular beams with the aspect ratio of "16:9".

The actuator 250 causes reciprocal movement of the beam shaper 160A (frequency: 100 Hz, amplitude: 200 μm) along a perpendicular surface to an optical axis (in a direction shown by the arrow in FIG. 7). As described above in the first embodiment, the actuator 250 causes the reciprocal movement of the beam shaper 160A with smaller amplitude than the second element lens 162A, so as to reduce the speckle noise.

The pupil uniformizer 140 makes the emission angle distribution of the red, green and blue laser beams uniform, respectively. As a result, the intensity distribution of the incident laser beams to the beam shaper 160A becomes uniform.

Chromatic dispersion of a glass material of the pupil uniformizer 140 causes differences in beam sectional area among the red, green and blue laser beams. In this embodiment, the beam sectional area of the incident blue laser beam to the beam shaper 160A becomes the largest among these laser beams. The beam sectional area of the incident red laser beam to the beam shaper 160A becomes the smallest among these laser beams. The sectional area of the incident green laser beam to the beam shaper 160A is larger than the beam sectional area of the red laser beam, and smaller than the beam sectional area of the blue laser beam.

The laser projector 100A of this embodiment includes the red, green and blue laser sources 110r, 110g, 110b. The sectional area of the incident red laser light beam to the beam shaper 160A is smaller than the sectional area of the blue or green laser beam. The light intensity distribution at the exit pupil 131 of the projector lens 130 is influenced by the sectional area of the incident laser beam to the beam shaper 160A. In this embodiment, in terms of the uniform light intensity distribution at the exist pupil 131 of the projector lens 130, the magnitude relationship of the sectional areas among the blue, green and red laser beams (blue>green>red) is defined.

The blue laser beam, which is the shortest in wavelength, is the most influential to the human retina among the blue, green and red laser beams. Accordingly, it is preferable in terms of safety that the intensity of the blue laser beam is set to be low at the exit pupil 131 of the projector lens 130. In this embodiment, in order to reduce the intensity of the blue laser beam at the exit pupil 131 of the projector lens 130, the sectional area of the incident blue laser beam to the beam shaper 160A is larger than the sectional areas of the other laser beams.

The green laser beam has the highest in terms of the luminosity function. Accordingly, it decreases the speckle noise as a bright point where a person feels bright if the sectional area of the green laser beam becomes large at the exit pupil 131 of the projector lens 130. However, an excessively large sectional area of the green laser beam at the exit pupil 131 of the projector lens 130 results in light quantity loss. Accordingly, in this embodiment, the sectional area of the incident green laser beam to the beam shaper 160A is set to be larger than the beam sectional area of the red laser beam, and smaller than the beam sectional area of the blue laser beam.

The red laser beam is less influential to the safety and the speckle noise than the other laser beams. It decreases loss of the light quantity if the sectional area of the red laser beam is decreased at the exit pupil 131 of the projector lens 130. Accordingly, the sectional area of the red laser beam emitted from the red laser source 110r of the laser projector 100A is set to be smaller than the sectional areas of the blue and green laser beams. Thus, the laser projector 100A may safely project images with little speckle noise under efficient light utilization.

The laser projector 100A of this embodiment includes the red, green and blue laser sources 110r, 110g, 110b. The multiplex prism 112 makes the red, green and blue laser beams coaxial after the emission from the red, green and blue laser sources 110r, 110g, 110b, respectively. The pupil uniformizer 140 by itself then makes the uniform light intensity of the red, green and blue laser beams, respectively.

An excessively large difference in the light intensity distribution at the exit pupil of the projector lens among the red, green and blue laser beams, which are emitted from the red, green and blue laser sources, respectively, causes color irregularity of displayed images on the display surface because of the peripheral light quantity ratio of the projector lens.

In this embodiment, the pupil uniformizer 140 by itself makes the light intensity of the red, green and blue laser beams uniform, respectively. Therefore, the light intensity distribution at the exit pupil 131 of the projector lens 130 becomes a similar or resembled shape among the red, green and blue laser beams, which results in decreased color irregularity of displayed images by the laser projector 100A on the display surface.

The laser projector 100A includes a rectangular parallelpiped PBS 190 in this embodiment. Alternatively, the laser projector may include a thin plate-like beam splitter such as a wire grid. The principles of this embodiment are also applied to the laser projector which uses a transmission type liquid crystal element to generate the image light.

Third Embodiment

Figure 8:
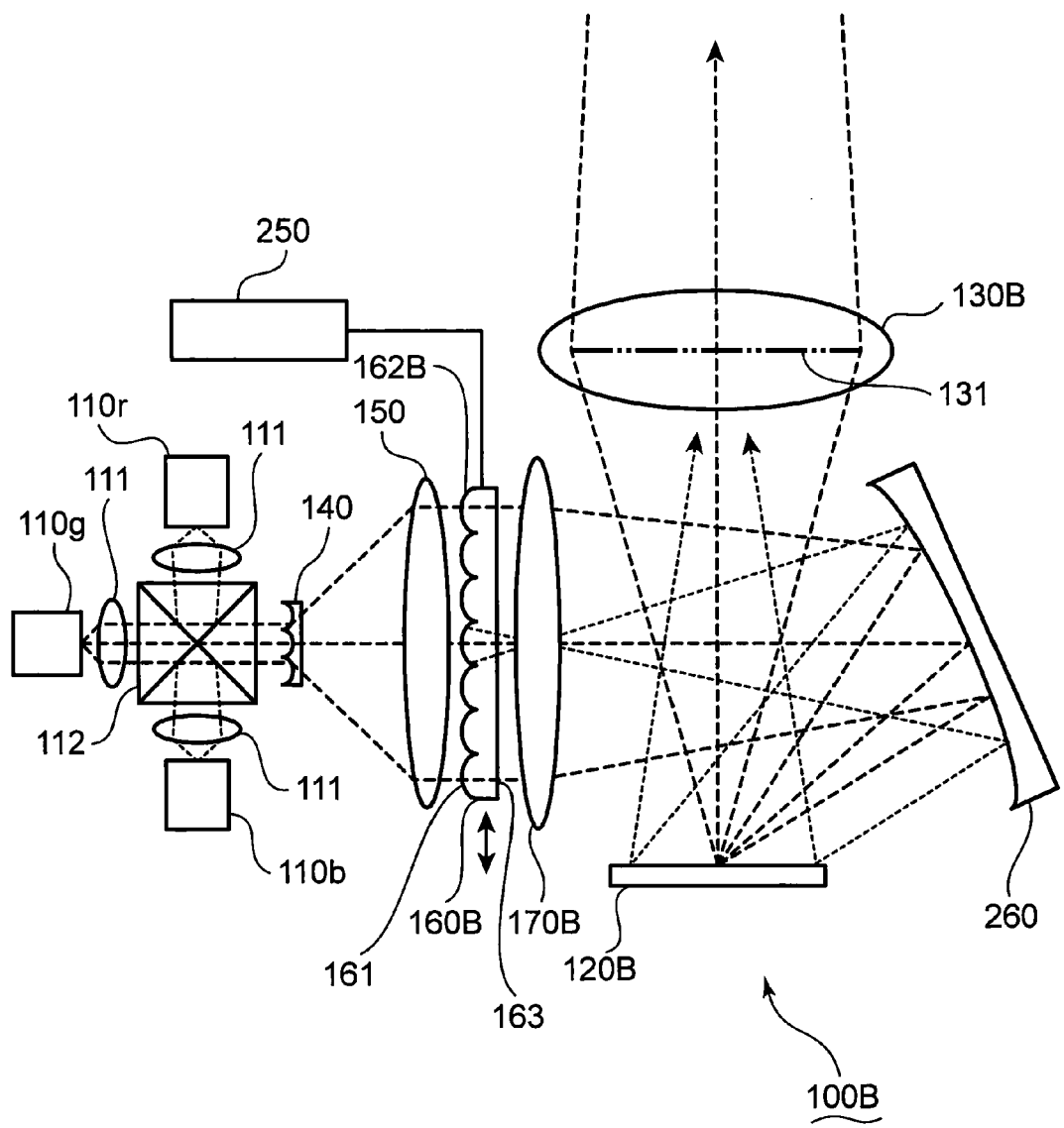
FIG. 8 is a schematic view of a laser projector according to the third embodiment.

FIG. 8 is a schematic view of a laser projector 100B according to the third embodiment. The laser projector 100B is described with reference to FIGS. 2 and 8. It should be noted that the similar symbols and numerals are assigned to the similar components, which are described in the first and second embodiments. The descriptions about these similar components are omitted.

Like the laser projector 100 of the first embodiment, the laser projector 100B includes the pupil uniformizer 140, the collimator 150 and the actuator 250. Like the laser projector 100A of the second embodiment, the laser projector 100B further includes the red, green and blue laser sources 110r, 110g, 110b, the collimator 111 and the multiplex prism 112.

The laser projector 100B further includes a spatial light modulator 120B which modulates the laser beams to generate the image light. In this embodiment, DMD (Digital Micromirror Device) is used as the spatial light modulator 120B. The laser projector 100B displays color images by means of the red, green and blue laser beams.

The laser beams emitted from the red, green and blue laser sources 110r, 110g, 110b are collimated by the collimators 111. The multiplex prism 112 then makes the laser beams coaxial.

In this embodiment, an aspect ratio of the DMD used as the spatial light modulator 120B is "4:3". The spatial light modulator 120B modulates the red, green and blue laser beams by means of the time division methodology. Accordingly, the emission timings of the laser beams from the red, green and blue laser sources 110r, 110g, 110b are synchronized with the modulating operation of the spatial light modulator 120B. Namely, the emission operations of the red, green and blue laser sources 110r, 110g, 110b are sequentially switched.

The laser projector 100B further includes a beam shaper 160B, which shapes the laser beam into the shape of the spatial light modulator 120B, a condenser lens 170B, which condenses the shaped laser beam, and a concave mirror 260, which reflects the laser beam transmitted through the condenser lens 170B toward the spatial light modulator 120B. The coaxial laser beams generated by the multiplex prism 112 pass through the pupil uniformizer 140, the collimator 150, the beam shaper 160B and the condenser lens 170B sequentially, and then reaches the concave mirror 260. The concave mirror 260 then reflects the laser beam toward the spatial light modulator 120B to illuminate the spatial light modulator 120B.

The beam shaper 160B includes the incident end surface 161, to which the laser beam from the collimator 150 is incident, and the emission end surface 163 opposite to the incident end surface 161. The beam shaper 160B is formed from rectangular second element lenses 162B, which are horizontally and vertically clustered. Like the spatial light modulator 120B, each second element lens 162B has an aspect ratio of "4:3".

A convex paraboloid (lens surface) is formed on the incident end surface 161 of the second element lenses 162B. Each substantially rectangular parallelpiped second element lens 162B is "about 0.16 mm" in width and "about 0.12 mm" in height. The curvature radius of the lens surface of the second element lens 162B is "about 0.1 mm", and the cone constant thereof is "about −1". The laser beams emitted from the second element lenses 162B are spread in response to the divergent angles of the second element lenses 162B and superimposed on each other, so that the laser beams are shaped into rectangular beams with the aspect ratio of "4:3".

The actuator 250 causes the reciprocal movement of the beam shaper 160B (frequency: 200 Hz, amplitude: 100 μm) along a perpendicular surface to the optical axis (in a direction shown by the arrow in FIG. 8). As described above in the first embodiment, the actuator 250 causes the reciprocal movement of the beam shaper 160B with smaller amplitude than the second element lens 162B to reduce the speckle noise.

The laser projector 100B further includes a projector lens 130B. The spatial light modulator 120B operates micro mirrors (not shown) to guide only the image light, which is displayed on the display surface to the projector lens 130B.

The beam shaper 160B is positioned in the conjugated relationship with the exit pupil 131 of the projector lens 130B. Accordingly, the light intensity of the incident laser beam to the beam shaper 160B is reflected on the light intensity distribution at the exit pupil 131 of the projector lens 130B.

As described above with reference to FIG. 2, the pupil uniformizer 140 of the laser projector 100B includes the first element lenses 142, which are horizontally and vertically clustered. Accordingly, the pupil uniformizer 140 may appropriately make the light intensity distribution of the incident laser beams to the beam shaper 160B uniform. As a result, the light intensity distribution also becomes uniform at the exit pupil 131 of the projector lens 130B. Thus, the laser projector 100B may safely project images with little speckle noise.

In this embodiment, F# of the projector lens 130B is 2.4. The longitudinal beam diameter D of the incident laser beam to the beam shaper 160B is 6 mm. The combined focal distance f of the condenser lens 170B with the concave mirror 260 is 14.5 mm. In this embodiment, the condenser lens 170B and the concave mirror 260 are exemplified as the lens group.

The laser projector 100B having the set values of the aforementioned optical parameter satisfies the aforementioned relationship of "F#<f/D<2×F#". Accordingly, the laser projector 100B may safely project images with efficient light utilization.

Fourth Embodiment

Figure 9:
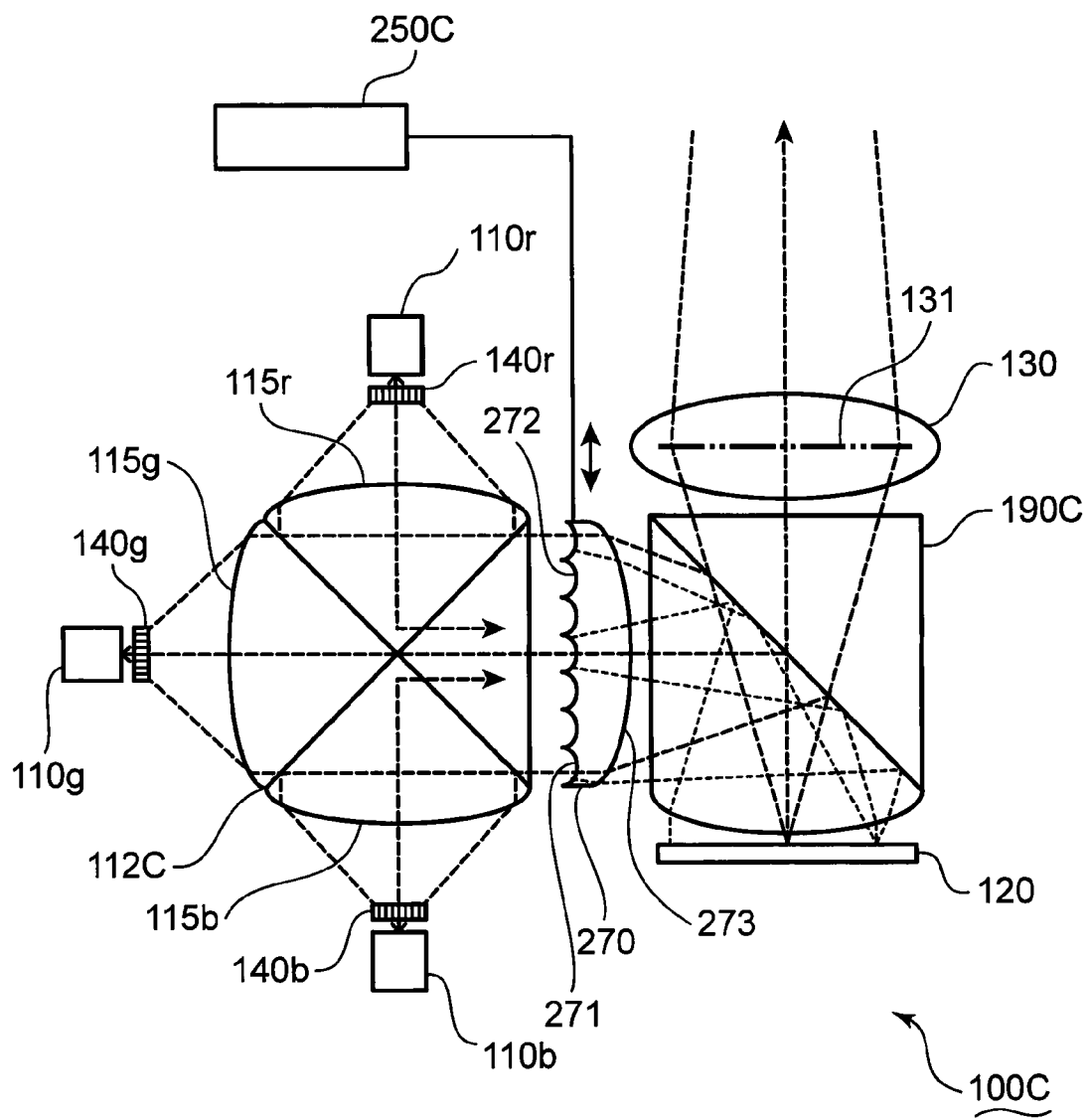
FIG. 9 is a schematic view of a laser projector according to the fourth embodiment.

FIG. 9 is a schematic view of a laser projector 100C according to the fourth embodiment. The laser projector 100C is described with reference to FIG. 9. It should be noted that the similar symbols and numerals are assigned to the similar components, which are described in the first to third embodiments. The descriptions about these similar components are omitted.

Like the laser projector 100 of the first embodiment, the laser projector 100C includes the spatial light modulator 120 and the projector lens 130. Like the laser projector 100A of the second embodiment, the laser projector 100C further includes the red, green and blue laser sources 110r, 110g, 110b.

The laser projector 100C further includes a multiplex prism 112C with lenses situated among the red, green and blue laser sources 110r, 110g, 110b. The multiplex prism 112C functioning as a compound optical component includes lens surfaces.

The laser projector 100C further includes a compound lens 270, which is situated beside the multiplex prism 112C, and a PBS 190C with lenses, which is situated among the compound lens 270, the spatial light modulator 120 and the projector lens 130. In this embodiment, the laser projector 100C functions as a color laser projector.

The laser projector 100C further includes pupil uniformizers 140r, 140g, 140b, which corresponds to optical paths toward the multiplex prism 112C from the red, green and blue laser source 110r, 110g, 110b, respectively. The red, green and blue laser beams emitted from the red, green and blue laser sources 110r, 110g, 110b are incident to the pupil uniformizers 140r, 140g, 140b, respectively.

Like the pupil uniformizer 140 described in the first to third embodiments, each of the pupil uniformizers 140r, 140g, 140b includes the first element lenses (described later). A cluster of the first element lenses appropriately makes emission angles of the red, green and blue laser beams uniform.

The multiplex prism 112C with lenses collimates and multiplexes the laser beams, and then guides the red, green and blue laser beams to the compound lens 270.

The compound lens 270 includes an incident end surface 271, to which the laser beam passing through the multiplex prism 112C is incident, and an emission end surface 273 opposite to the incident end surface 271. The second element lenses 272 are horizontally and vertically clustered over the incident end surface 271. A convex lens is formed on the emission end surface 273, so that the emission end surface 273 functions as a condenser lens.

The laser beam emitted from the compound lens 270 passes through the PBS 190C with lenses to illuminate the spatial light modulator 120. The laser beam modulated by the spatial light modulator 120 passes through the PBS 190C with lenses, and reaches the projector lens 130. The laser beam is eventually projected on the display surface from the projector lens 130.

The pupil uniformizers 140r, 140g, 140b make the light intensity distribution uniform at the exit pupil 131 of the projector lens 130. Accordingly, the laser projector 100C may safely project images with little speckle noise.

Figure 10A:
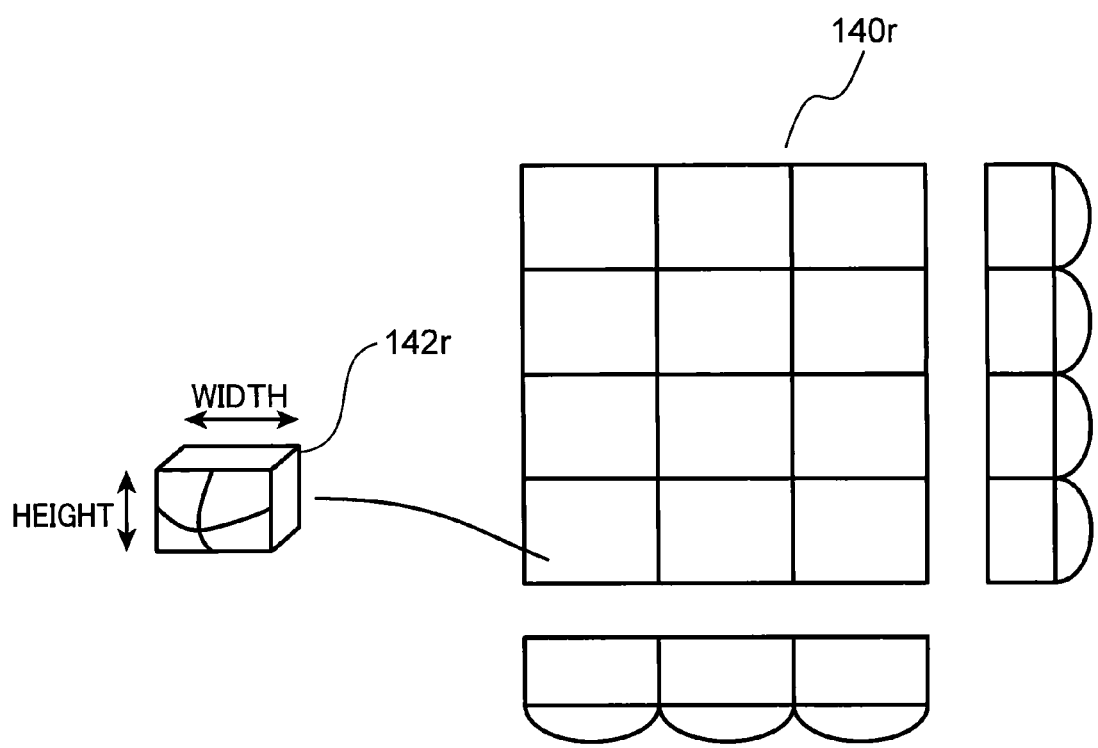
FIG. 10A is a schematic view of a pupil uniformizer situated between a red laser source and a multiplexing prism.
Figure 10B:
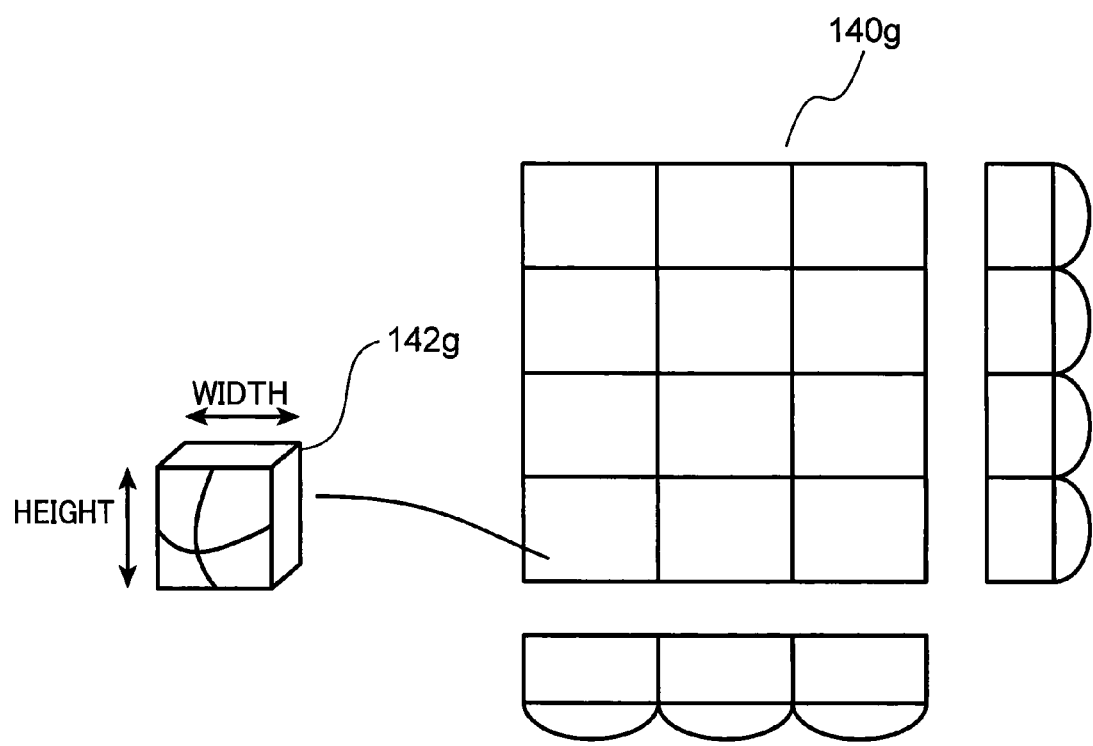
FIG. 10B is a schematic view of the pupil uniformizer situated between a green laser source and the multiplexing prism.
Figure 10C:
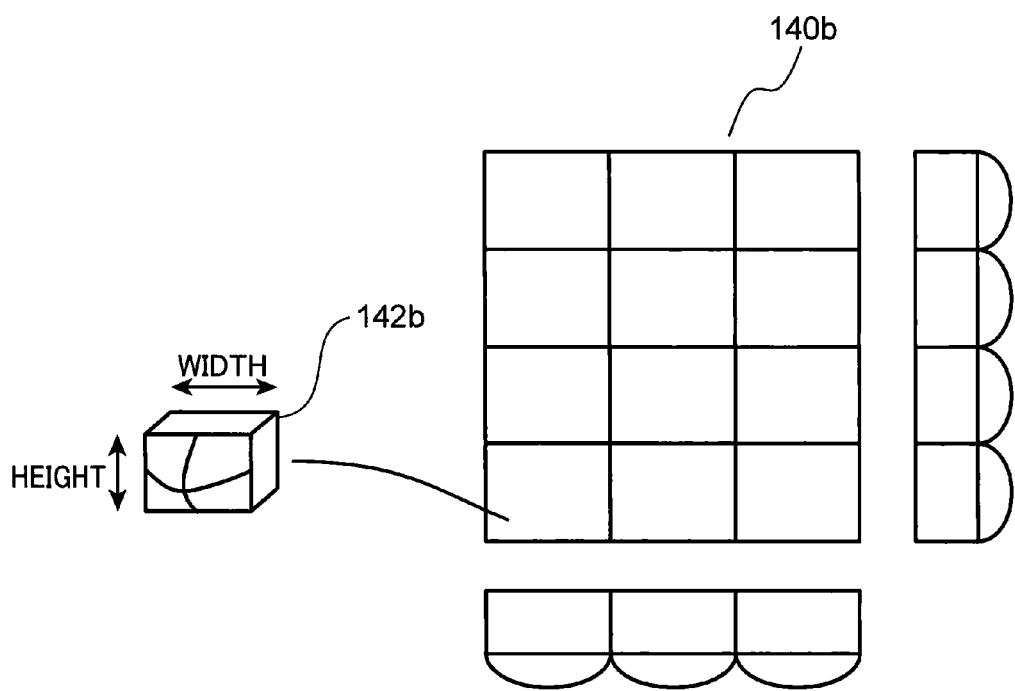
FIG. 10C is a schematic view of the pupil uniformizer situated between a blue laser source and the multiplexing prism.

FIG. 10A is a schematic view of the pupil uniformizer 140r situated between the red laser source 110r and the multiplex prism 112C. FIG. 10B is a schematic view of the pupil uniformizer 140g situated between the green laser source 110g and the multiplex prism 112C. FIG. 10C is a schematic view of the pupil uniformizer 140b situated between the blue laser source 110b and the multiplex prism 112C.

The pupil uniformizer 140r includes several first element lenses 142r. The first element lens 142r is a rectangular convex lens. The first element lenses 142r are clustered so as to form the pupil uniformizer 140r.

The first element lens 142r is "about 0.08 mm" in width and "about 0.06 mm" in height. The curvature center of the curved surface of the first element lens 142r corresponds to the center of a rectangular surface. The curvature radius of the first element lens 142r is "about 0.04 mm", and the cone constant thereof is "about −1". The first element lens 142r is a convex paraboloid lens.

Like the pupil uniformizer 140r, the pupil uniformizers 140g, 140b are also formed from the clustered first element lenses 142g, 142b, respectively. The first element lenses 142g, 142b have the same curvature radius and cone constant as those of the first element lens 142r. However, the first element lenses 142g, 142b are different in width and height from the first element lens 142r.

The first element lens 142g is a rectangular lens, which is "about 0.09 mm" in width and height both. The first element lens 142b is a rectangular lens, which is "about 0.08 mm" in width and "about 0.09 mm" in height.

The laser projector 100C includes the pupil uniformizers 140r, 140g, 140b, which have different divergent angles in response to the emission angles of the red, green and blue laser sources 110r, 110g, 110b. In this embodiment, semiconductor lasers are used as the red and blue laser sources 110r, 110b. A wavelength conversion laser is used as the green laser source 110g. The emission angle distribution of the green laser source 110g is largely different in response to a polarization direction from those of the red and blue laser sources 110r, 110b as the semiconductor lasers.

The width and height dimensions of the first element lens 142r are different values. The width and height dimensions of the first element lens 142b are also different values. Such a difference between the width and height dimensions results from a design for making the emission angle distribution of the laser beams immediately after the emission from the red and blue laser sources 110r, 110b substantially circular distribution. The width and height dimensions of the first element lenses 142r, 142b are set in response to a polarization direction of each of the red and blue laser sources 110r, 110b.

The green laser source 110g, for which the wavelength conversion laser is used, emits substantially collimated light. Accordingly, the first element lens 142g is designed so that the divergent angles in the width and height directions become large, respectively.

In this embodiment, the pupil uniformizers 140r, 140g, 140b, which are different in divergent angle, are used for the red, green and blue laser sources 110r, 110g, 110b. Accordingly, anisotropy of the light intensity distribution is reduced at the exit pupil 131. It should be noted that anisotropic light intensity distribution at the exit pupil 131 deteriorates images, for example, color irregularity on the display surface. The laser projector 100C of this embodiment reduces the anisotropy of the light intensity distribution at the exit pupil 131 to display quality images.

The divergent angle of the pupil uniformizer 140r corresponding to the red laser beam is preferably set to be smaller than the divergent angles of the pupil uniformizers 140g, 140b corresponding to the green and blue laser beams, respectively. The maximum tilt angle of the first element lens 142r is set to be smaller than the maximum tilt angles of the first element lenses 142g, 142b, which results in a small divergent angle of the pupil uniformizer 140r of the laser projector 100C.

The red laser beam is less influential on the safety and the speckle noise. Therefore, it is preferable that the pupil uniformizer 140r makes the intensity distribution of the red laser beam uniform to enhance the efficiency for light utilization as much as possible. In this embodiment, the divergent angle of the pupil uniformizer 140r is set to be smaller than the divergent angles of the pupil uniformizers 140g, 140b corresponding to the green and blue laser beams, respectively. Accordingly, there is little loss in the optical components, through which the red laser beam passes, so that light is efficiently utilized.

The multiplex prism 112C with lenses is a cross prism including lens surfaces 115r, 115g, 115b to which the red, green and blue laser beams are incident, respectively. The lens surfaces 115r, 115g, 115b formed on the surface of the multiplex prism 112C function as Fresnel lenses.

As described above, the pupil uniformizers 140r, 140g, 140b of the laser projector 100C function to make the light intensity distribution uniform in response to the emission angle distribution of the laser beam. The laser beam is formed into substantially collimated light by the lens surfaces 115r, 115g, 115b. In this embodiment, the lens surfaces 115r, 115g, 115b are integrally formed with the multiplex prism 112C having the multiplexing function.

The laser beam, of which the light intensity distribution is made uniform by the pupil uniformizers 140r, 140g, 140b in response to the emission angle distribution, has to be collimated by lens portions such as the lens surfaces 115r, 115g, 115b. The lens portion, which is integrally formed with an optical element that performs another process (e.g., coaxialization and multiplexing) to the laser beam, results in a decreased number of components and adjustment axes. As a result, the laser projector 100C becomes compact, which in turn leads to cost reduction.

A dichroic mirror and a beam shaper are exemplified as an optical element, in which lens portions are integrally incorporated, to collimate the laser beam, in addition to the aforementioned multiplex prism 112C.

In this embodiment, the pupil uniformizers 140r, 140g, 140b are situated just after the red, green and blue laser sources 110r, respectively. In this embodiment, the lens surfaces 115r, 115b are used to receive the light from the semiconductor laser (the red and blue laser sources 110r, 110b) and collimate the light from the pupil uniformizers 140r, 140b. Thus, each of the lens surfaces 115r, 115b has two functions, so that the part number of the laser projector 100C is reduced. Thus, the laser projector 100C becomes compact, which in turn leads to cost reduction.

In this embodiment, the pupil uniformizers 140r, 140g, 140b are situated just after the red, green and blue laser sources 110r, 110g, 110b, respectively, to decrease intensive power spots of the laser beam. Since the intensive power spots of the laser beam are reduced in the laser projector 100C, it becomes less likely that the laser beam leaks with high power density even if a cover for preventing the laser beam with high power density from leaking in the laser projector 100C is accidentally dismantled during manufacture of the laser projector 100C, which results in enhanced safety of the laser projector 100C.

Each second element lens 272 of the compound lens 270 is a lens having the concave paraboloid. The second element lens 272 is "about 0.32 mm" in width and "about 0.24 mm" in height. The curvature radius of a substantially rectangular second element lens 272 is "about 0.2 mm", and the cone constant thereof is "about −1". The laser beams passing through the second element lens 272 are superimposed on each other, and are shaped into a rectangular beam cross-section.

The laser projector 100C further includes an actuator 250C. The actuator 250C causes circular movement of the compound lens 270 along a perpendicular surface to the optical axis. In this embodiment, the actuator 250C is exemplified as the movement mechanism.

The compound lens 270 of the laser projector 100C is an integral optical component of the beam shaper and the condenser lens described in the first to third embodiments. The compound lens 270 moves along the perpendicular surface to the optical axis.

The beam shaper formed from the second element lenses sometimes causes a diffraction pattern on the spatial light modulator, in response to a repetitive pattern of an arrangement of the second element lenses. Such a diffraction pattern causes illumination irregularity on the spatial light modulator.

The laser projector 100C of this embodiment has the compound lens 270 of the beam shaper and the condenser lens. The compound lens 270 is moved by the actuator 250C to move the diffraction pattern on the spatial light modulator 120 and decrease the aforementioned illumination irregularity. The movement of the compound lens 270 means the movement of a focal point of each second element lens 272. Accordingly, it becomes less likely that the image at the focal point of the second element lens 272 with strong light intensity is generated at the exit pupil 131 of the projector lens 130. Thus, the laser projector 100C may safely project images with little speckle noise.

The PBS 190C with lenses is an integral optical component, which works as the field lens and the PBS described in the first to third embodiments, which results in a decreased part number of the laser projector 100C. Thus, the laser projector 100C becomes compact, which in turn leads to cost reduction.

In this embodiment, each of the second element lenses 272 used for the compound lens 270 has the same shape and size. Alternatively, the second element lenses used for the compound lens may be different in size with the same shapes. Yet alternatively, the second element lenses used for the compound lens may be different in shape with substantially the same divergent angles. The compound lens may be formed from such a cluster of the second element lenses.

The compound lens is preferably formed from a cluster of the second element lenses which have similar shapes and different sizes. It becomes less likely that a cluster of the second element lenses, which are different in shape, causes the resultant diffraction pattern from the repetitive pattern in an array of the second element lenses. Therefore, there is little illumination irregularity on the spatial light modulator.

Fifth Embodiment

Figure 11:
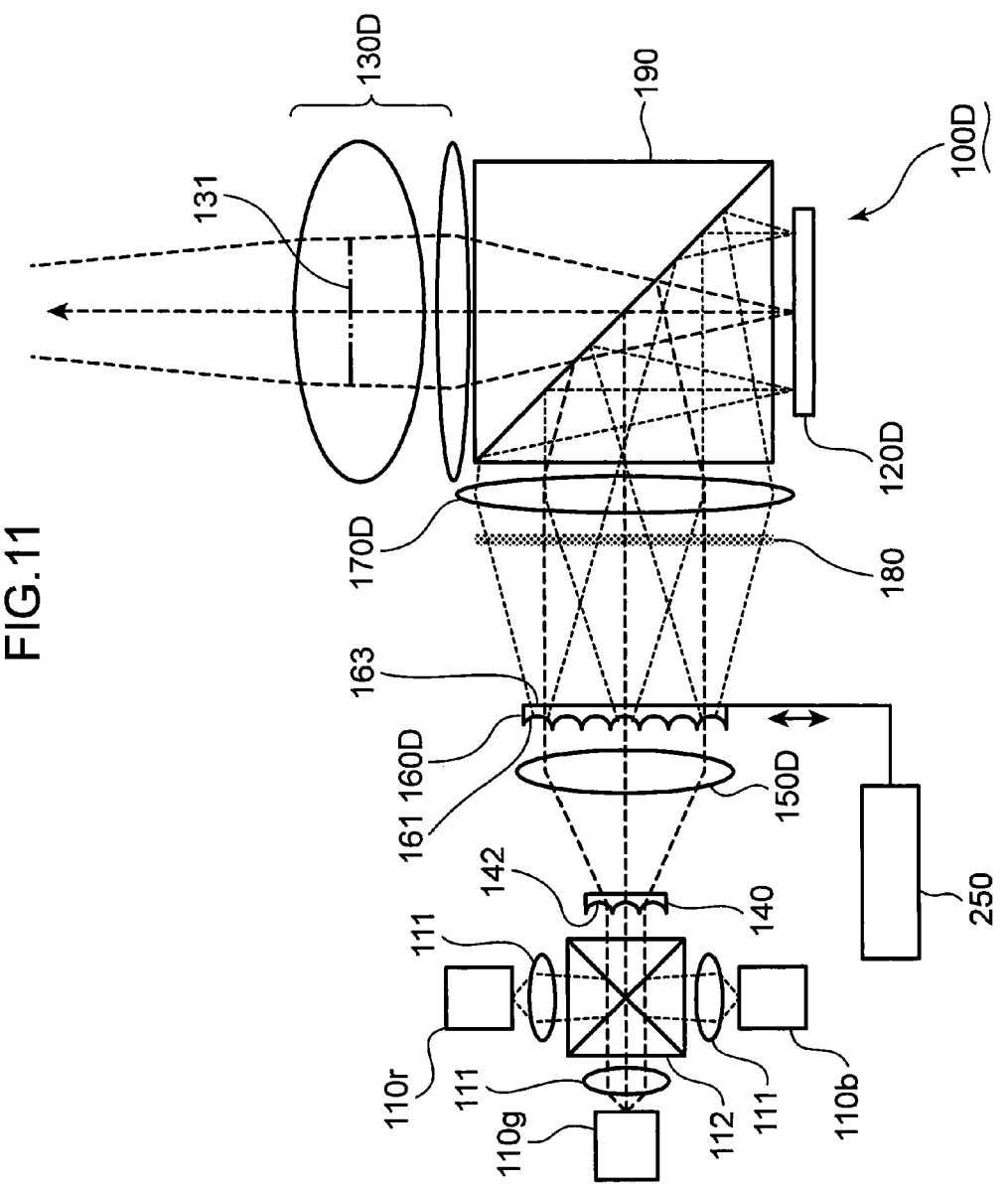
FIG. 11 is a schematic view of a laser projector according to the fifth embodiment.

FIG. 11 is a schematic view of a laser projector 100D according to the fifth embodiment. The laser projector 100D is described with reference to FIG. 11. It should be noted that the similar symbols and numerals are assigned to the similar components which are described in the first to fourth embodiments. The descriptions about the similar components are omitted.

Like the laser projector 100 of the first embodiment, the laser projector 100D includes the pupil uniformizer 140, the light diffuser 180, the PBS 190 and the actuator 250. Like the laser projector 100A of the second embodiment, the laser projector 100D further includes the red, green and blue laser sources 110r, 110g, 110b, the collimator 111 and the multiplex prism 112.

The laser projector 100D further includes a beam shaper 160D with the spherical aberration corrected by means of the cone constant, and the condenser lens 170D, which also functions as a field lens.

The red, green and blue laser beams emitted from the red, green and blue laser sources 110r, 110g, 110b are collimated by the corresponding collimators 111, respectively. The multiplex prism 112 then makes the red, green and blue laser beams coaxial.

The laser projector 100D further includes the spatial light modulator 120D which modulates the laser beam to generate the image light. In this embodiment, LCOS (aspect ratio of 16:9) is suitably used as the spatial light modulator 120D. The spatial light modulator 120D modulates the red, green and blue laser beams by the time division methodology. Accordingly, the emission timings of the laser beams from the red, green and blue laser sources 110r, 110g, 110b are synchronized with the modulating operation of the spatial light modulator 120D. Namely, the emission operations of the red, green and blue laser sources 110r, 110g, 110b may be sequentially switched.

The laser projector 100D further includes a collimator 150D which collimates the coaxial laser beams generated by the multiplex prism 112. The coaxial laser beam generated by the multiplex prism 112 passes through the pupil uniformizer 140, the collimator 150D, the beam shaper 160D, the light diffuser 180, the condenser lens 170D and the PBS 190, and then illuminates the spatial light modulator 120D.

Figure 12:
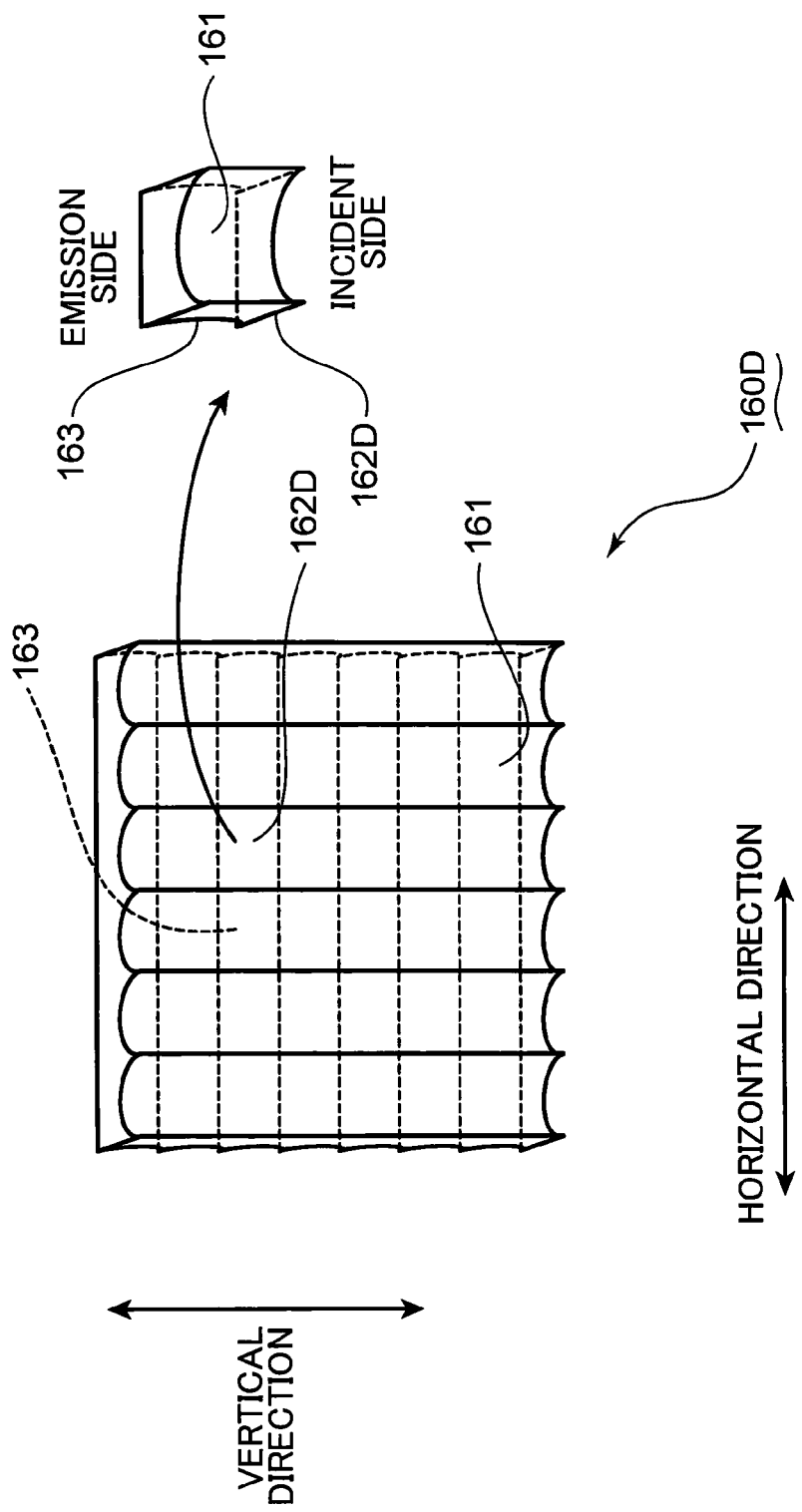
FIG. 12 is a perspective view of a beam shaper.

FIG. 12 is a schematic perspective view of the beam shaper 160D. The beam shaper 160D and the laser projector 100D are described with reference to FIGS. 11 and 12.

The beam shaper 160D includes the incident end surface 161, to which the laser beam from the collimator 150D is incident, and the emission end surface 163 opposite to the incident end surface 161.

The left drawing of FIG. 12 entirely shows the beam shaper 160D. As shown in the left drawing of FIG. 12, a cylindrical lens array which horizontally curves in response to the curvature radius is formed on the incident end surface 161 of the beam shaper 160D. A cylindrical lens array, which vertically curves in response to the curvature radius, is formed on the emission end surface 163 of the beam shaper 160D. The cylindrical array formed on the incident end surface 161 perpendicularly extends with respect to the cylindrical lens array formed on the emission end surface 163.

The right drawing of FIG. 12 is a schematic perspective view of a substantially rectangular parallelpiped second element lens 162D used as a part of the aforementioned cylindrical lens array. A lens width of the cylindrical lens formed as the incident end surface 161 of the second element lens 162D is "about 0.183 mm", and the curvature radius thereof is "about −0.1 mm", and the cone constant thereof is "about −0.7". The lens surface formed on the incident end surface 161 functions as an aspheric concave cylindrical lens, wherein the spherical aberration is corrected by means of the aforementioned cone constant.

The lens width of the cylindrical lens formed as the emission end surface 163 of the second element lens 162D is "about 0.21 mm", the curvature radius thereof is "about −0.2 mm", and the cone constant thereof is "about −1.8". The lens surface formed on the emission end surface 163 functions as an aspheric concave cylindrical lens, wherein the spherical aberration is corrected by means of the aforementioned cone constant.

As shown in the left drawing of FIG. 12, the second element lenses 162D with concave lenses, which are formed on the incident end surface 161 and the emission end surface 163, respectively, are horizontally and vertically clustered. The beam shaper 160D is formed of acrylic resin (refractive index n: 1.49). The cone constant of the second element lens 162 is set, so that the refractive index ($\sin \theta$) of the lens becomes linear in a diameter direction with taking account of the refractive index of the acrylic resin.

Figure 13:
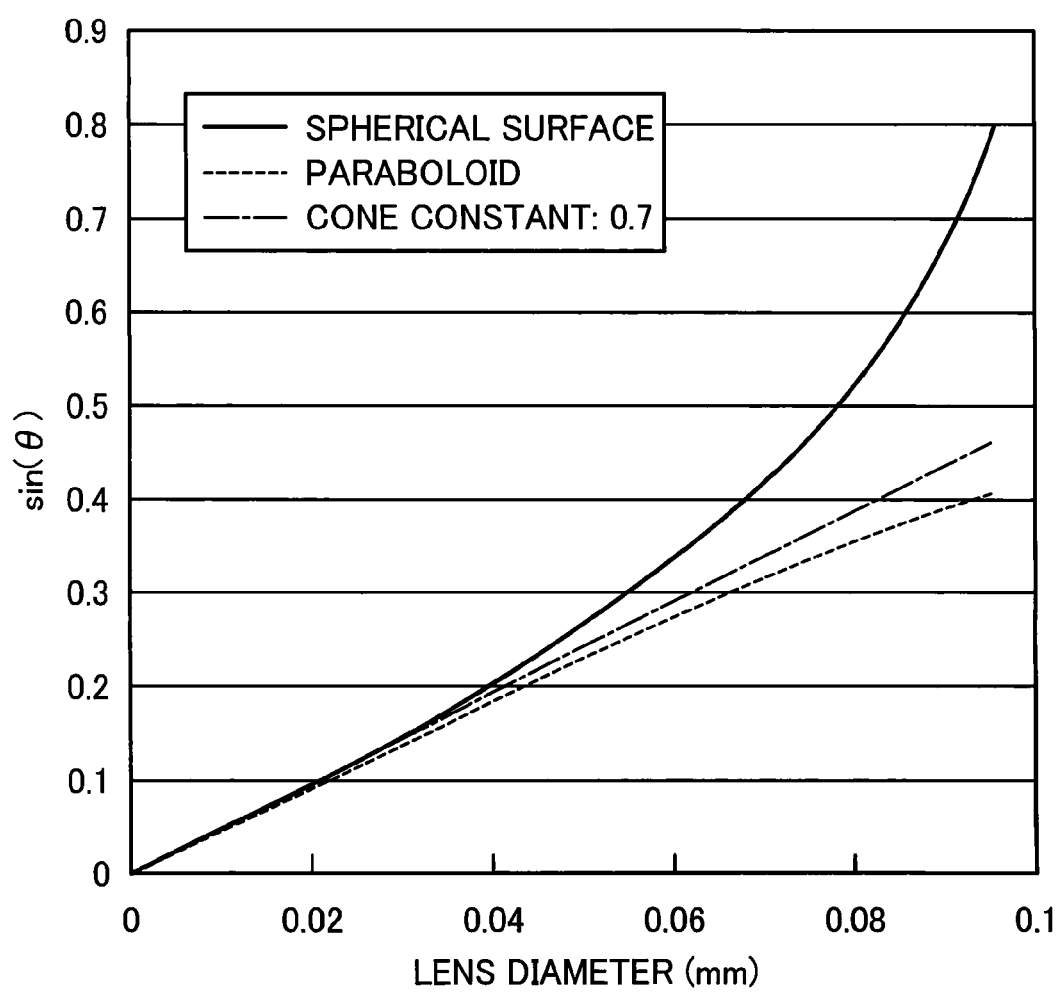
FIG. 13 is a graph showing a relationship between a lens diameter and a refraction angle (sin θ) at an incident end surface of a second element lens which is formed from acrylic resin.

FIG. 13 is a graph showing a relationship between a lens diameter and a refracting angle ($\sin \theta$) at the incident end surface 161 of the second element lenses 162D formed from the acrylic resin. FIG. 13 shows data about the refracting angles of the lenses formed into a spherical shape (cone constant: 0), a paraboloid (cone constant: −1) and a lens according to this embodiment (cone constant: −0.7). The various refracting angles among them are compared with reference to FIGS. 11 to 13.

With respect to the spherical surface, the relationship between sin θ and the lens diameter is diversified in the positive direction as the lens diameter becomes larger. This means that the periphery of the spatial light modulator becomes dark. Meanwhile, in the case of the paraboloid, and in the case of the cone constant being "−0.7", the relationship between the sin θ and the lens diameter becomes substantially linear. This means that the overall spatial light modulator (up to the periphery of the spatial light modulator) is irradiated with a uniform light quantity.

As described above, the curved lens surface is formed on the incident end surface 161 and the emission end surface 163 of the second element lens 162D. The emission end surface 163 is different in spherical aberration from the incident end surface 161. Accordingly, the lens formed on the emission end surface 163 is different in cone constant from the lens formed on the incident end surface 161.

The aforementioned principles may be similarly applied to a design of the pupil uniformizer 140. Namely, the spherical aberration of the first element lens 142 used for the pupil uniformizer 140 may be corrected by means of the cone constant or the second-order aspheric coefficient.

The laser projector 100D further includes a projector lens 130D. The light modulated by the spatial light modulator 120D passes through the PBS 190 and the projector lens 130D, and then is projected on the display surface. The exit pupil 131 of the projector lens 130D is set in the conjugated relationship with the position of the beam shaper 160D. Accordingly, the intensity distribution of the incident laser beam to the beam shaper 160D is reflected on the light intensity distribution at the exit pupil 131 of the projector lens 130D. In this embodiment, the pupil uniformizer 140 appropriately makes the intensity distribution of the light incident to the beam shaper 160D uniform. Accordingly, the light intensity distribution becomes appropriately uniform at the exit pupil 131 of the projector lens 130D.

The condenser lens 170D carries out condensation and telecentric conversion of the beams spreading from the beam shaper 160D, and also functions as the field lens. Since the condenser lens 170D also functions as the field lens, the part number of the laser projector 100D is reduced, so that the laser projector 100D becomes inexpensive.

Sixth Embodiment

Figure 14A:
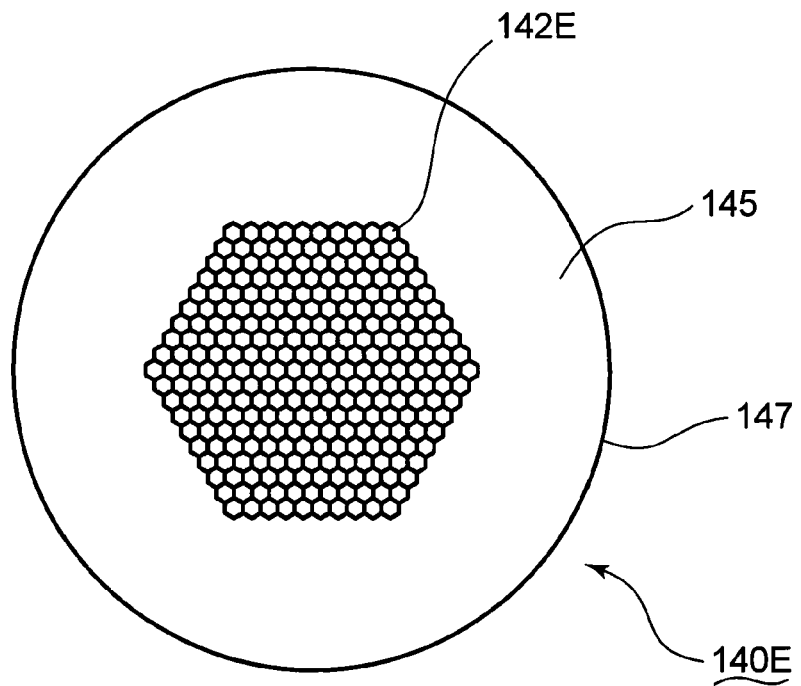
FIG. 14A is a schematic planar view of pupil uniformizer.
Figure 14B:
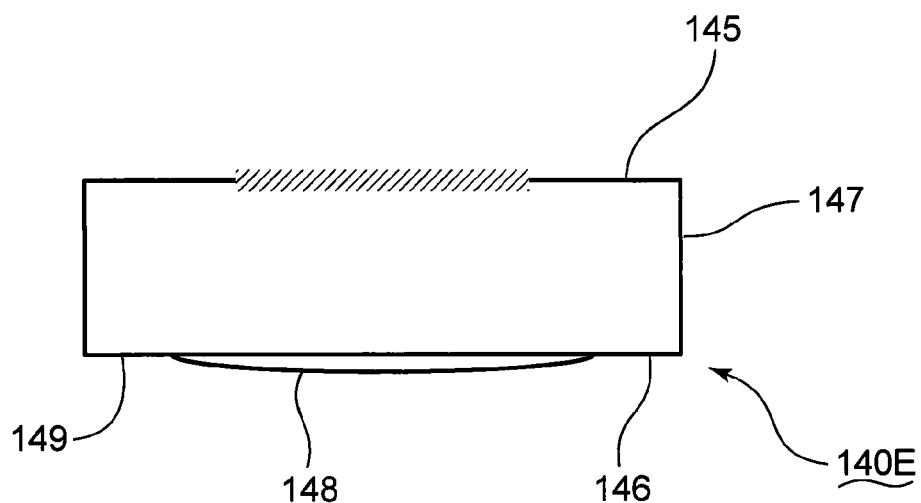
FIG. 14B is a side view of the pupil uniformizer.

A substantially disc-like pupil uniformizer 140E shown in FIG. 14A and FIG. 14B is described in the sixth embodiment. The pupil uniformizer 140E may be used as the pupil uniformizer of the laser projector according to the aforementioned series of the embodiments.

FIG. 14A is a schematic planar view of the pupil uniformizer 140E. FIG. 14B is a schematic side view of the pupil uniformizer 140E. The pupil uniformizer 140E is described with reference to FIGS. 14A and 14B.

The substantially disc-shaped pupil uniformizer 140E includes a substantially flat first end surface 145, a second end surface 146 opposite to the first end surface 145, and a circumferential surface 147 between the first and second end surfaces 145, 146. One of the first and second end surfaces 145, 146 is used as the incident end surface to which the laser beam is incident, and the other is used as the emission end surface from which the laser beam is emitted.

The pupil uniformizer 140E includes first element lenses 142E formed on the first end surface 145. As described in the first to fifth embodiments, the substantially regular hexagonal first element lenses 142E are clustered over the first end surface 145, so as to make the light intensity distribution uniform at the exit pupil of the projector lens. Accordingly, the honeycomb structure composed of the first element lenses 142E is formed on the first end surface 145.

Each first element lens 142E is a concave aspheric lens. A lens pitch of the first element lenses 142E is "about 0.75 mm", and the curvature radius thereof is "about −0.05 mm", and the cone constant thereof is "about −0.7".

The pupil uniformizer 140E includes a spherical protrusion 148, which is formed on the second end surface 146, and a flat surface 149. For example, the curvature radius of the protrusion 148 is about 7 mm. If the laser beam is incident to the first end surface 145 (having the honeycomb structure composed of the first element lenses 142E), the laser beam is emitted from the protrusion 148. If the laser beam is incident to the protrusion 148, the laser beam is emitted from the honeycomb structure composed of the first element lenses 142E.

The protrusion 148 is formed on the second end surface 146 of the pupil uniformizer 140E on which the first element lenses 142E are clustered. The protrusion 148 formed at the center of the second end surface 146 may condense the light passing through the pupil uniformizer 140E toward the axis extending through the center of the pupil uniformizer 140E. Accordingly, the laser beams are uniformly spread on the first end surface 145, on which the first element lenses 142E are clustered, in a range from the center to the periphery of the pupil uniformizer 140E. The light passing through the center portion of the pupil uniformizer 140E is then refracted by the protrusion 148 of the second end surface 146, with a refractive index different from the refractive index for the a surrounding light. As a result, the light intensity distribution becomes uniform at the exit pupil of the projector lens.

The pupil uniformizer 140E of this embodiment is appropriately molded by the pressure molding technology, which is applied to a glass material. The protrusion 148 formed on the second end surface 146 is appropriately utilized for centering of the lens during the pressure molding. Accordingly, the pupil uniformizer 140E may be easily molded.

Without any protrusion, (i.e., if the second end surface is entirely flat), a lens material is deviated to a corner of a molding die. As a result, for example, burrs easily occur between the first and second end surfaces. The deviation of the lens material upon molding may be suppressed by the protrusion 148 of the pupil uniformizer 140E of this embodiment, so that it becomes less likely that there are molding failures such as burrs.

The aforementioned embodiments mainly include the following configurations. The light intensity distribution of the projected image and the light intensity distribution at the exit pupil of the projector lens become uniform by means of the laser projector with the following configurations. A safe laser projector which does not emit excessively intensive light may be provided. As a result of the uniform light intensity distribution of the projected image and the uniform light intensity distribution at the exit pupil of the projector lens, it becomes less likely that there is resultant speckle noise from locally intensive light. Therefore, a compact laser projector according to the principles of the above embodiments may achieve high safety with little speckle noise.

The laser projector according to one aspect of the aforementioned embodiments includes: a laser source section configured to emit laser beams; a spatial light modulator which modulates the laser beams to generate image light; a projector lens from which the image light is emitted; a beam shaper configured to shape the laser beam into a shape of the spatial light modulator; and a pupil uniformizer which makes a light intensity distribution uniform at an exit pupil of the projector lens, wherein the pupil uniformizer is situated between the laser source section and the beam shaper.

According to the aforementioned configuration, the laser beam emitted from the laser source section is shaped into the shape of the spatial light modulator. The spatial light modulator modulates the shaped laser beam to generate the image light. The image light is emitted through the projector lens, so that the laser projector displays images to a viewer.

The beam shaper shapes the laser beam into the shape of the spatial light modulator. The pupil uniformizer situated between the laser source section and the beam shaper makes the light intensity distribution uniform at the exist pupil of the projector lens. Therefore, it becomes less likely that excessively intensive light is emitted, so that the laser projector may safely display the images with little speckle noise.

In the aforementioned configuration, preferably, the beam shaper is in a conjugated relationship with the exit pupil, and the pupil uniformizer makes an intensity distribution of incident light to the beam shaper uniform.

According to the above configuration, the pupil uniformizer makes a uniform intensity distribution of incident light to the beam shaper, which is set in the conjugated relationship with the exit pupil of the projector lens. Therefore, it becomes less likely that excessively intensive light is emitted. Accordingly, the laser projector may safely display the images with little speckle noise.

In the aforementioned configuration, preferably, the pupil uniformizer includes a cluster of first element lenses which make the light intensity distribution uniform, the beam shaper includes a cluster of second element lenses which shape the laser beams into the shape of the spatial light modulator, the first element lenses spread the laser beams in response to a divergent angle of the first element lenses to make the light intensity distribution uniform, and the second element lenses spread the laser beams in response to a divergent angle of the second element lenses to shape the laser beam.

According to the aforementioned configuration, a cluster of the first element lenses, which make the light intensity distribution uniform, spreads the laser beams in response to the divergent angle of the first element lenses to cause the uniform light intensity distribution. A cluster of the second element lenses, which shape the laser beams into the shape of the spatial light modulator, spreads the laser beams in response to the divergent angle of the second element lenses to shape the beam. Accordingly, the laser projector may safely display the images with little speckle noise.

In the aforementioned configuration, preferably, each of the first and second element lenses has a concave lens.

According to the aforementioned configuration, since each of the first and second element lenses has the concave lens, the laser beams are appropriately spread. Therefore, the laser projector may safely display the images with little speckle noise.

In the aforementioned configuration, preferably, each of the first and second element lenses has a curved surface to spread the laser beams, and the curved surface has a curvature distribution which decreases toward a contour of the curved surface.

According to the aforementioned configuration, each of the first and second element lenses has the curved surface to spread the laser beams. The curvature distribution of the curved surface is decreased toward the contour of the curved surface to easily obtain a uniform light intensity distribution.

In the aforementioned configuration, preferably, the laser projector further includes a light diffuser which diffuses the laser beams and makes the diffused laser beams incident to the spatial light modulator, wherein the laser beams, which are emitted from the beam shaper and then spread and superimposed on each other in response to the curvature distribution, are incident to the light diffuser.

According to the aforementioned configuration, the laser beams, which are emitted from the beam shaper and then spread and superimposed on each other in response to the curvature distribution, are incident to the light diffuser. The light diffuser then diffuses the laser beams so that the laser beams are incident to the spatial light modulator. Accordingly, the laser projector may safely display the images with little speckle noise.

In the aforementioned configuration, preferably, the laser projector further includes a condenser lens and a field lens, wherein the spatial light modulator is provided as a reflective type spatial light modulator, and the laser beams emitted from the beam shaper illuminate the reflective type spatial light modulator through the condenser lens and the field lens, and then are reflected by the reflective type spatial light modulator to reach the projector lens through the field lens.

According to the above configuration, the laser beams emitted from the beam shaper illuminate the reflective type spatial light modulator through the condenser lens and the field lens. The laser beams reflected by the reflective type spatial light modulator then reach the projector lens thorough the field lens. Thus, the laser projector may safely display the images with little speckle noise.

In the aforementioned configuration, preferably, a maximum numerical aperture of the second element lenses is no less than 0.3.

According to the aforementioned configuration, the maximum numerical aperture of the second element lenses is no less than 0.3. Therefore, a compact laser projector may be provided.

In the aforementioned configuration, preferably, the laser projector further includes a movement mechanism which causes a perpendicular motion of the beam shaper to an optical axis defined between the laser source section and the spatial light modulator, wherein if the laser beams are incident to the spatial light modulator through the light diffuser, the movement mechanism moves the beam shaper with smaller amplitude than a minimum sectional dimension of the second element lenses.

According to the aforementioned configuration, the movement mechanism causes the perpendicular motion of the beam shaper to the optical axis defined between the laser source section and the spatial light modulator. Therefore, if the laser beams are incident to the spatial light modulator through the light diffuser, the movement mechanism moves the beam shaper with smaller amplitude than the minimum sectional dimension of the second element lenses. Therefore, the laser projector may safely display the images with little speckle noise and with low power consumption.

In the aforementioned configuration, preferably, the laser source section includes: a red laser source, which emits a red laser beam, a green light source, which emits a green laser beam, and a blue laser source, which emits a blue laser beam, and a sectional area of the red laser beam incident to the beam shaper is smaller than sectional areas of the green and blue laser beams incident to the beam shaper.

According to the aforementioned configuration, the laser source includes the red, green and blue laser sources, which emit the red, green and blue laser beams, respectively. Accordingly, the laser projector may display the images by means of various color hues.

The sectional area of the red laser beams incident to the beam shaper is smaller than the sectional areas of the green and blue laser beams incident to the beam shaper. Accordingly, the laser projector may not only safely display the images with little speckle noise, but also efficiently utilize the light.

In the aforementioned configuration, preferably, a relationship of $F\# < f/D < 2 \times F\#$ is satisfied where $F\#$ is an f-number of the projector lens, D is a longitudinal beam diameter of the laser beams incident to the beam shaper, and f is a focal distance of a lens group through which the laser beams incident to the beam shaper pass up to the spatial light modulator.

According to the aforementioned configuration, the relationship of $F\# < f/D < 2 \times F\#$ is satisfied. Therefore, the laser projector may not only safely display the images with little speckle noise, but also efficiently utilize the light.

In the aforementioned configuration, preferably, the pupil uniformizer includes a surface on which there is a protrusion.

According to the above configuration, the pupil uniformizer includes the surface on which there is the protrusion. Therefore, the pupil uniformizer is easily fabricated by means of a pressure molding process.

INDUSTRIAL APPLICABILITY

The principles of the aforementioned embodiments are applicable to a compact projector, which achieves high luminance. In particular, the principles of the aforementioned embodiments are applicable to a mobile projector into which portable equipment is incorporated.

The invention claimed is:

1. A laser projector, comprising:
a laser source section configured to emit laser beams;
a spatial light modulator which modulates the laser beams to generate image light;
a projector lens from which the image light is emitted;
a beam shaper configured to shape the laser beam into a shape of the spatial light modulator, the beam shaper being in a conjugated relationship with an exit pupil of the projector lens; and
a pupil uniformizer which makes a light intensity distribution uniform at the exit pupil of the projector lens, wherein
the pupil uniformizer is situated between the laser source section and the beam shaper and makes an intensity distribution of incident light to the beam shaper uniform.

2. The laser projector according to claim 1, further comprising:
a condenser lens and a field lens, wherein
the spatial light modulator is provided as a reflective type spatial light modulator, and
the laser beams emitted from the beam shaper illuminate the reflective type spatial light modulator through the condenser lens and the field lens, and then are reflected by the reflective type spatial light modulator to reach the projector lens through the field lens.

3. The laser projector according to claim 1, wherein light emitted from a point on the beam shaper is focused on the exit pupil under the conjugated relationship.

4. A laser projector, comprising:
a laser source section configured to emit laser beams;
a spatial light modulator which modulates the laser beams to generate image light;
a projector lens from which the image light is emitted;
a beam shaper configured to shape the laser beam into a shape of the spatial light modulator; and
a pupil uniformizer which makes a light intensity distribution uniform at an exit pupil of the projector lens,
wherein the pupil uniformizer is situated between the laser source section and the beam shaper,
wherein the pupil uniformizer includes a cluster of first element lenses which make the light intensity distribution uniform,
wherein the beam shaper includes a cluster of second element lenses which shape the laser beams into the shape of the spatial light modulator,
wherein the first element lenses spread the laser beams in response to a divergent angle of the first element lenses to make the light intensity distribution uniform, and
wherein the second element lenses spread the laser beams in response to a divergent angle of the second element lenses to shape the laser beam.

5. The laser projector according to claim 4, wherein each of the first and second element lenses has a concave lens.

6. The laser projector according to claim 4, wherein each of the first and second element lenses has a curved surface to spread the laser beams, and
the curved surface has a curvature distribution which decreases toward a contour of the curved surface.

7. The laser projector according to claim 6, further comprising:
a light diffuser which diffuses the laser beams and makes the diffused laser beams incident to the spatial light modulator, wherein
the laser beams, which are emitted from the beam shaper and then spread and superimposed on each other in response to the curvature distribution, are incident to the light diffuser.

8. The laser projector according to claim 4, wherein a maximum numerical aperture of the second element lenses is no less than 0.3.

9. The laser projector according to claim 7, further comprising:
a movement mechanism which causes a perpendicular motion of the beam shaper to an optical axis defined between the laser source section and the spatial light modulator, wherein
if the laser beams are incident to the spatial light modulator through the light diffuser, the movement mechanism moves the beam shaper with smaller amplitude than a minimum sectional dimension of the second element lenses.

10. The laser projector according to claim 4, wherein the pupil uniformizer includes a surface on which there is a protrusion.

11. A laser projector, comprising:
a laser source section configured to emit laser beams;
a spatial light modulator which modulates the laser beams to generate image light;
a projector lens from which the image light is emitted;
a beam shaper configured to shape the laser beam into a shape of the spatial light modulator; and
a pupil uniformizer which makes a light intensity distribution uniform at an exit pupil of the projector lens,
wherein the pupil uniformizer is situated between the laser source section and the beam shaper,
wherein the laser source section includes a red laser source, which emits a red laser beam, a green light source, which emits a green laser beam, and a blue laser source, which emits a blue laser beam, and wherein a sectional area of the red laser beam incident to the beam shaper is smaller than sectional areas of the green and blue laser beams incident to the beam shaper.

12. A laser projector, comprising:

a laser source section configured to emit laser beams;

a spatial light modulator which modulates the laser beams to generate image light;

a projector lens from which the image light is emitted;

a beam shaper configured to shape the laser beam into a shape of the spatial light modulator; and a pupil uniformizer which makes a light intensity distribution uniform at an exit pupil of the projector lens, wherein the pupil uniformizer is situated between the laser source section and the beam shaper, and wherein a relationship of $F\# < f/D < 2 \times F\#$ is satisfied where $F\#$ is an f-number of the projector lens, D is a longitudinal beam diameter of the laser beams incident to the beam shaper, and f is a focal distance of a lens group through which the laser beams incident to the beam shaper pass up to the spatial light modulator.

* * * * *